Aug. 29, 1967  J. V. DAVIS ET AL  3,338,437
CONTROL SYSTEM FOR CONVEYING APPARATUS
Filed March 31, 1965   8 Sheets-Sheet 8
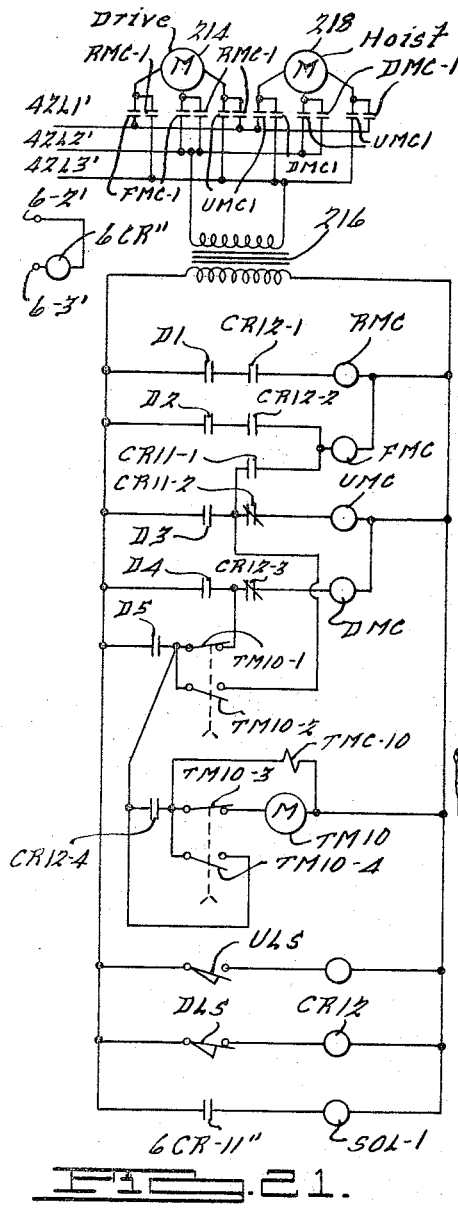
FIG. 21.
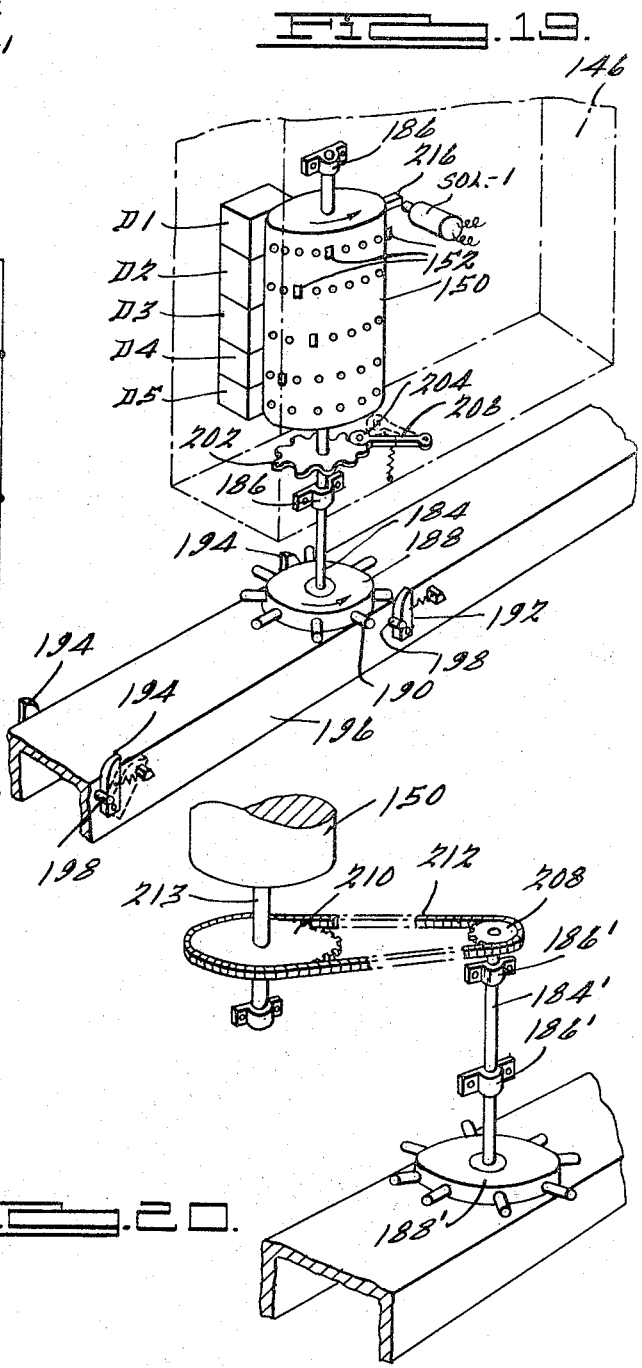
FIG. 19.
FIG. 20.
INVENTORS.
John V. Davis
Frank B. Walsh, Jr.
BY
Harness, Dickey & Pierce
ATTORNEYS.

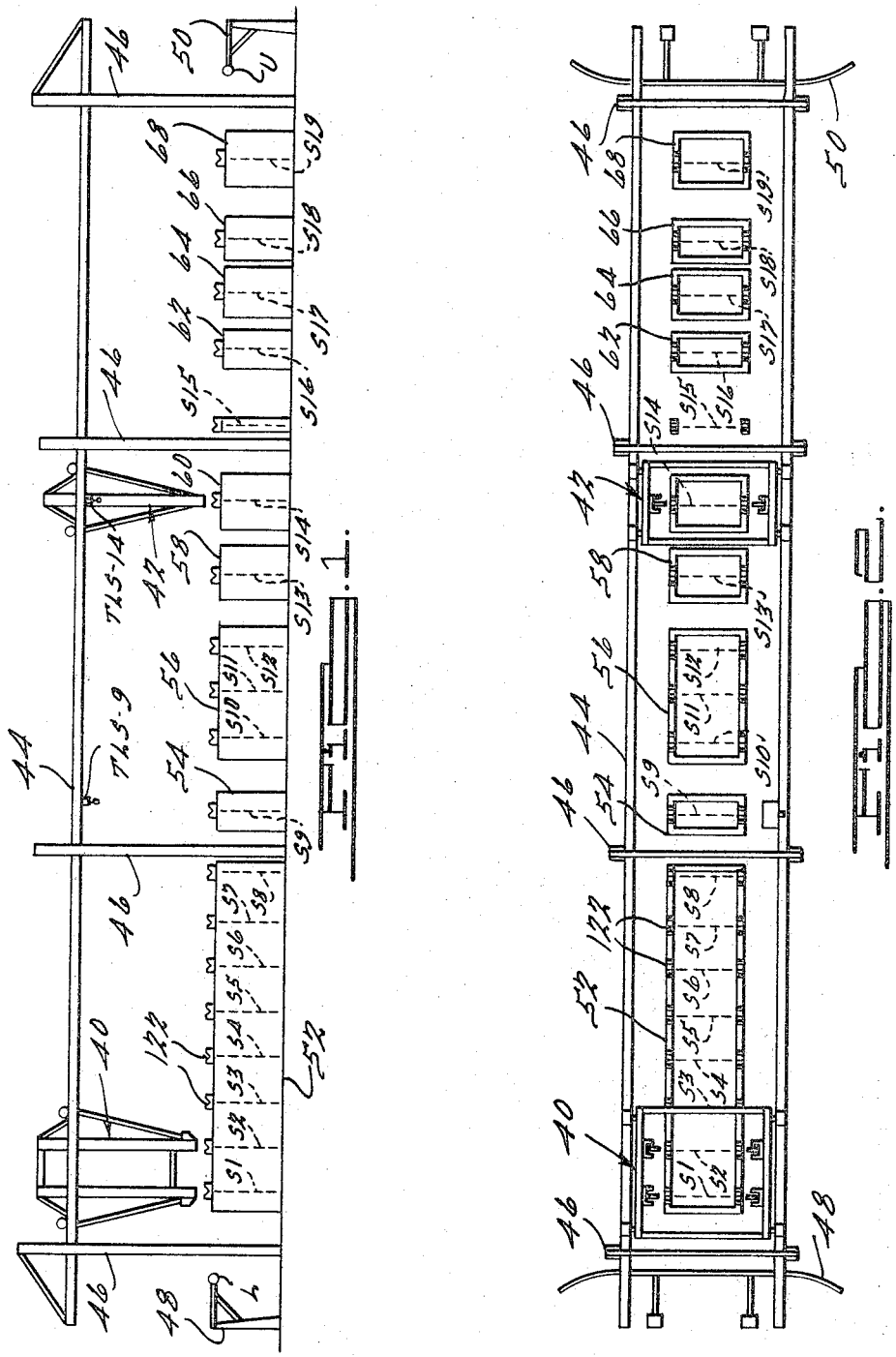

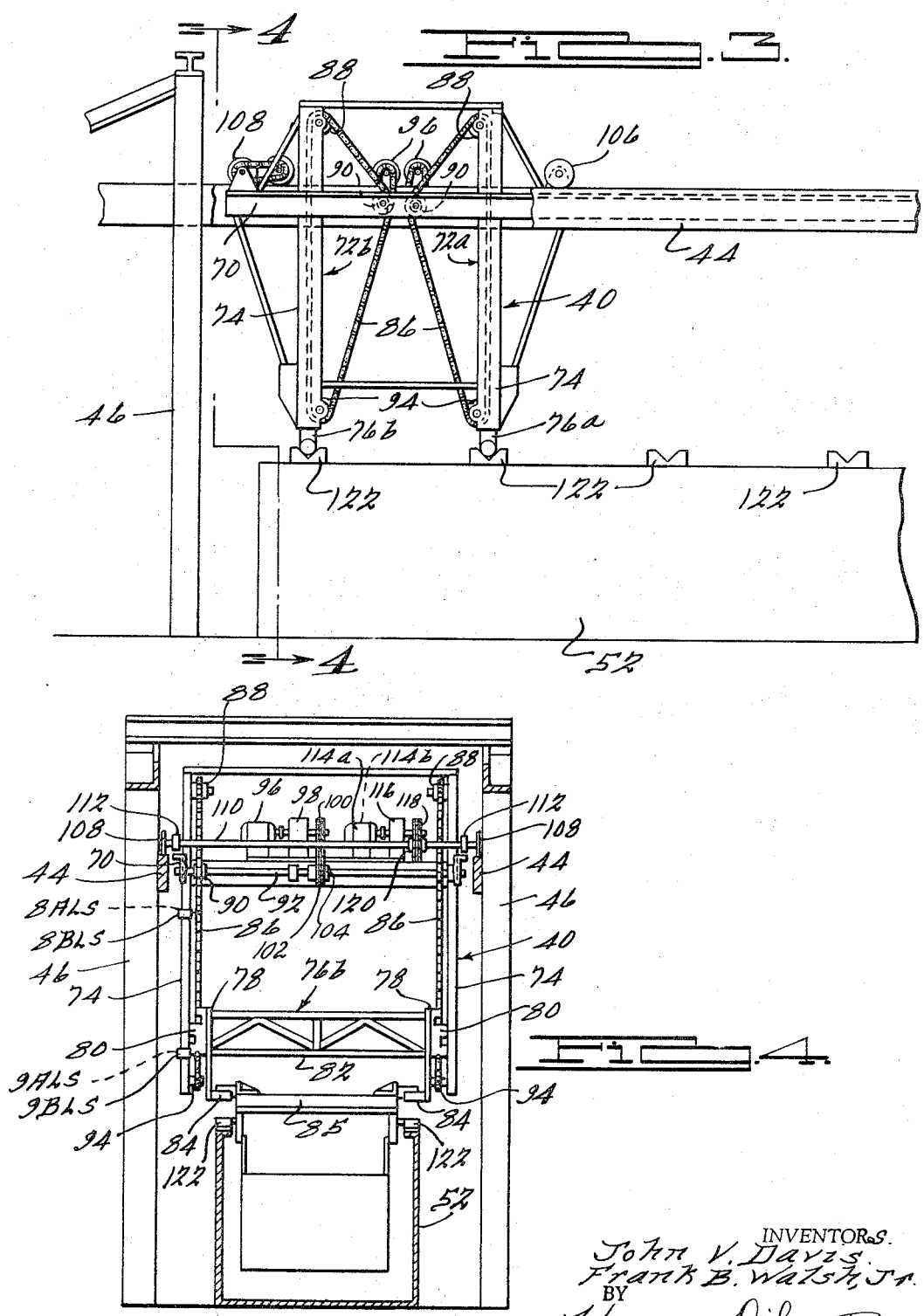

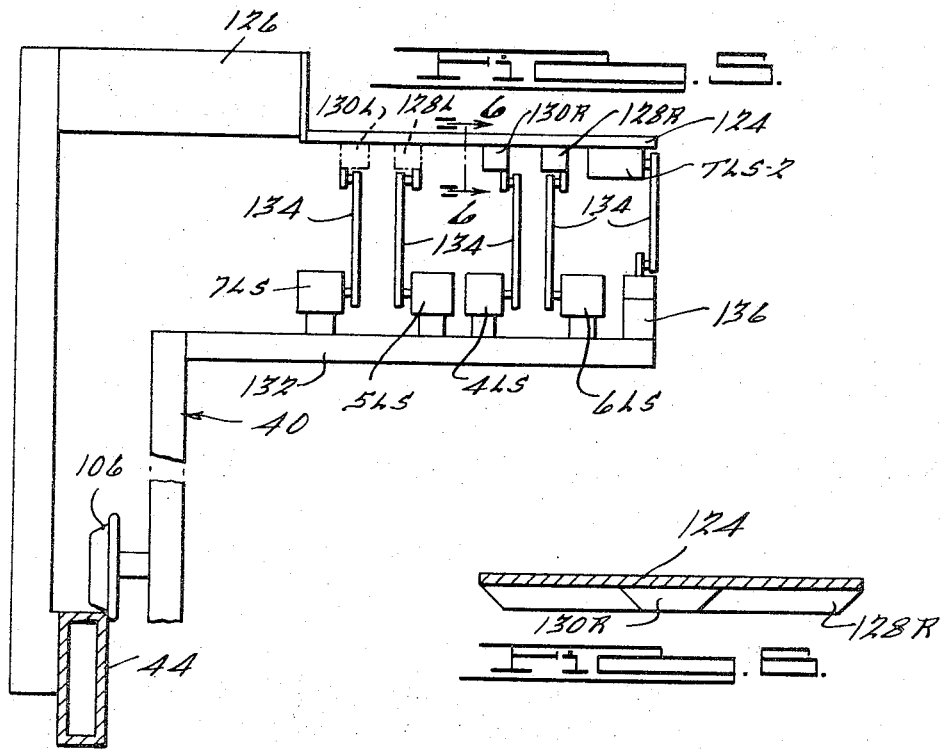

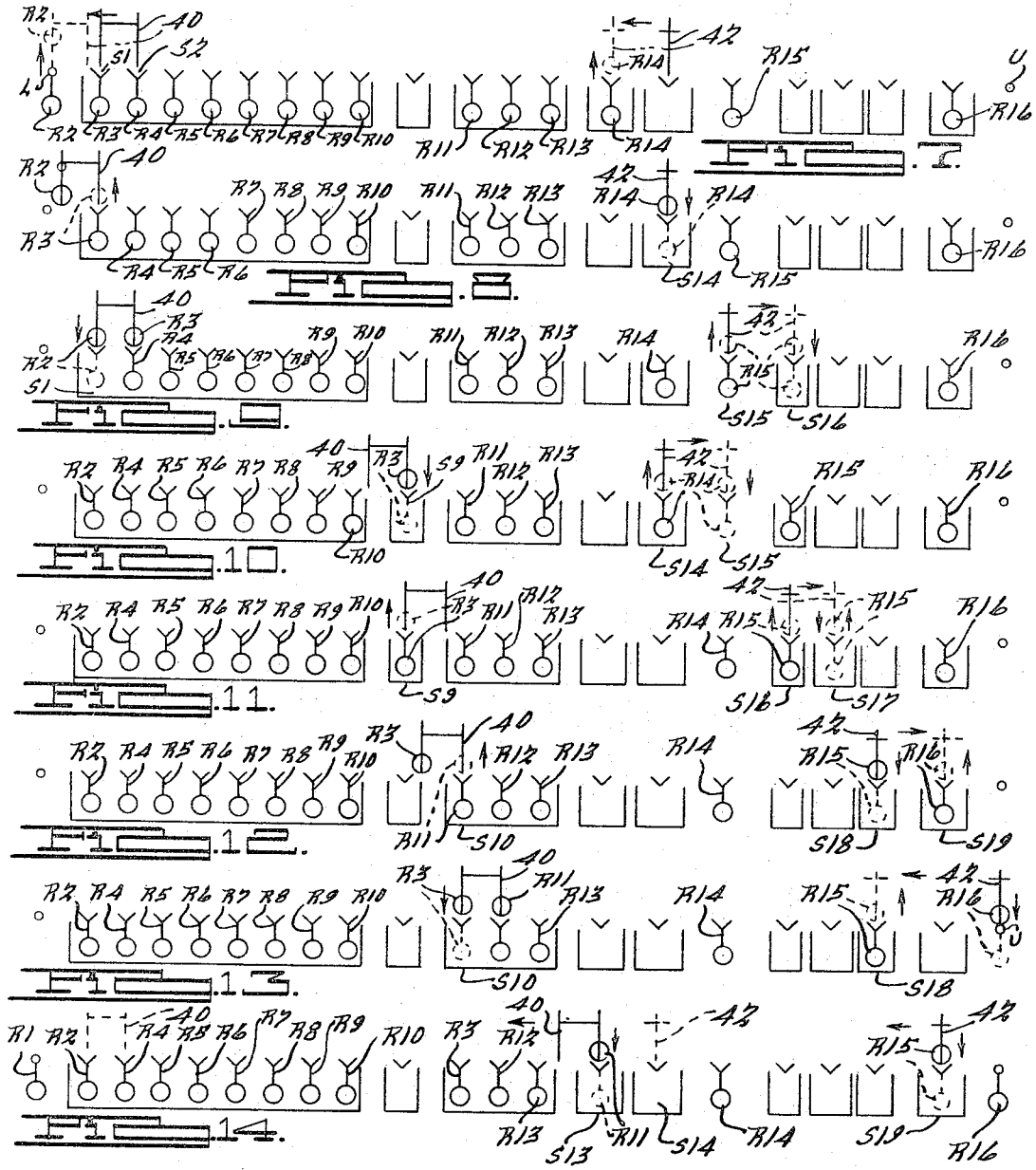
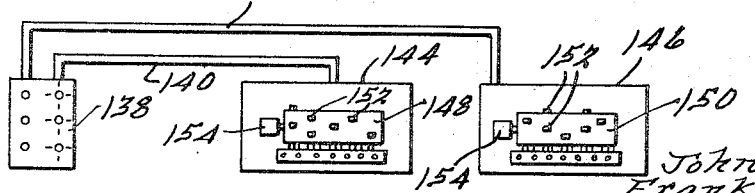

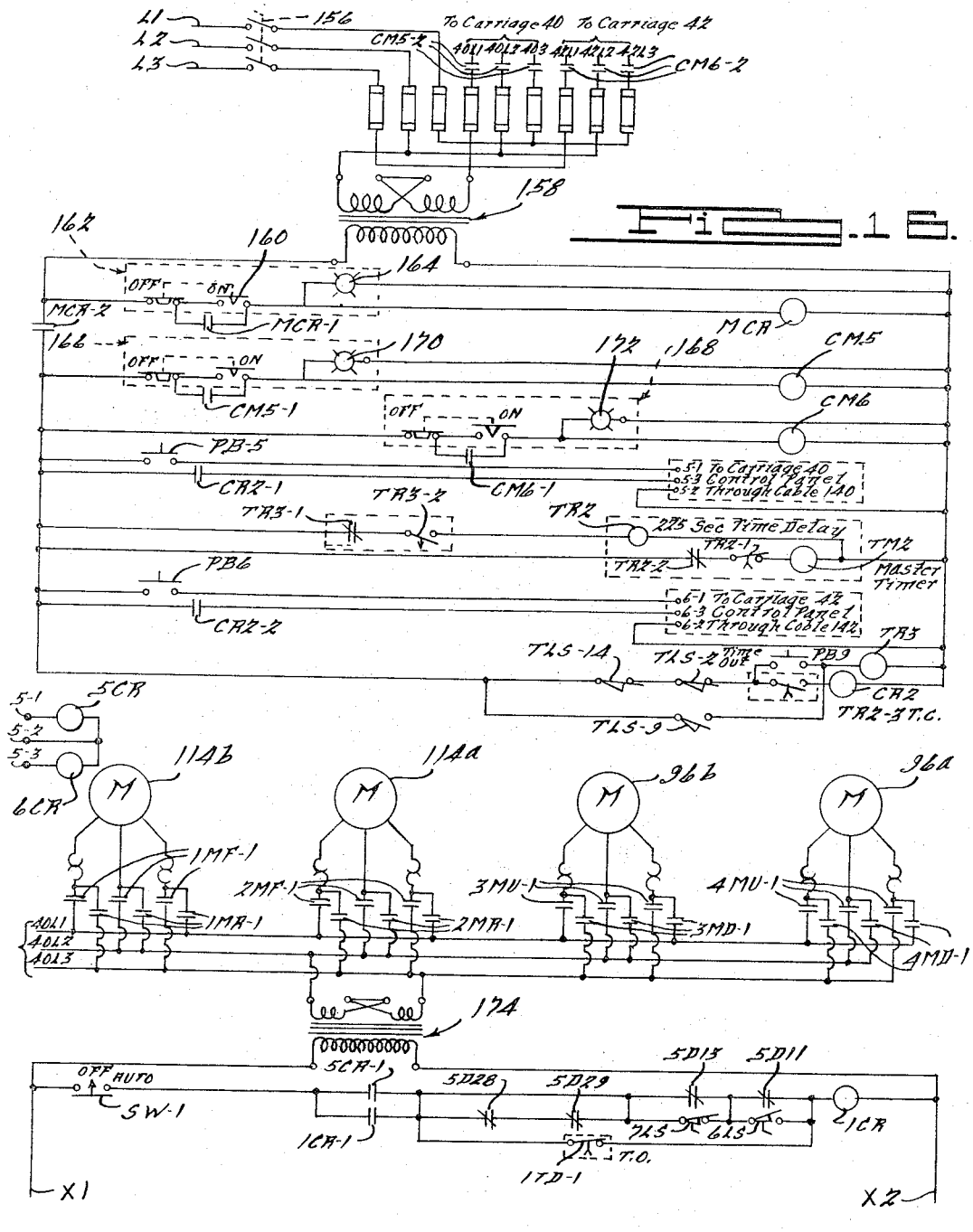

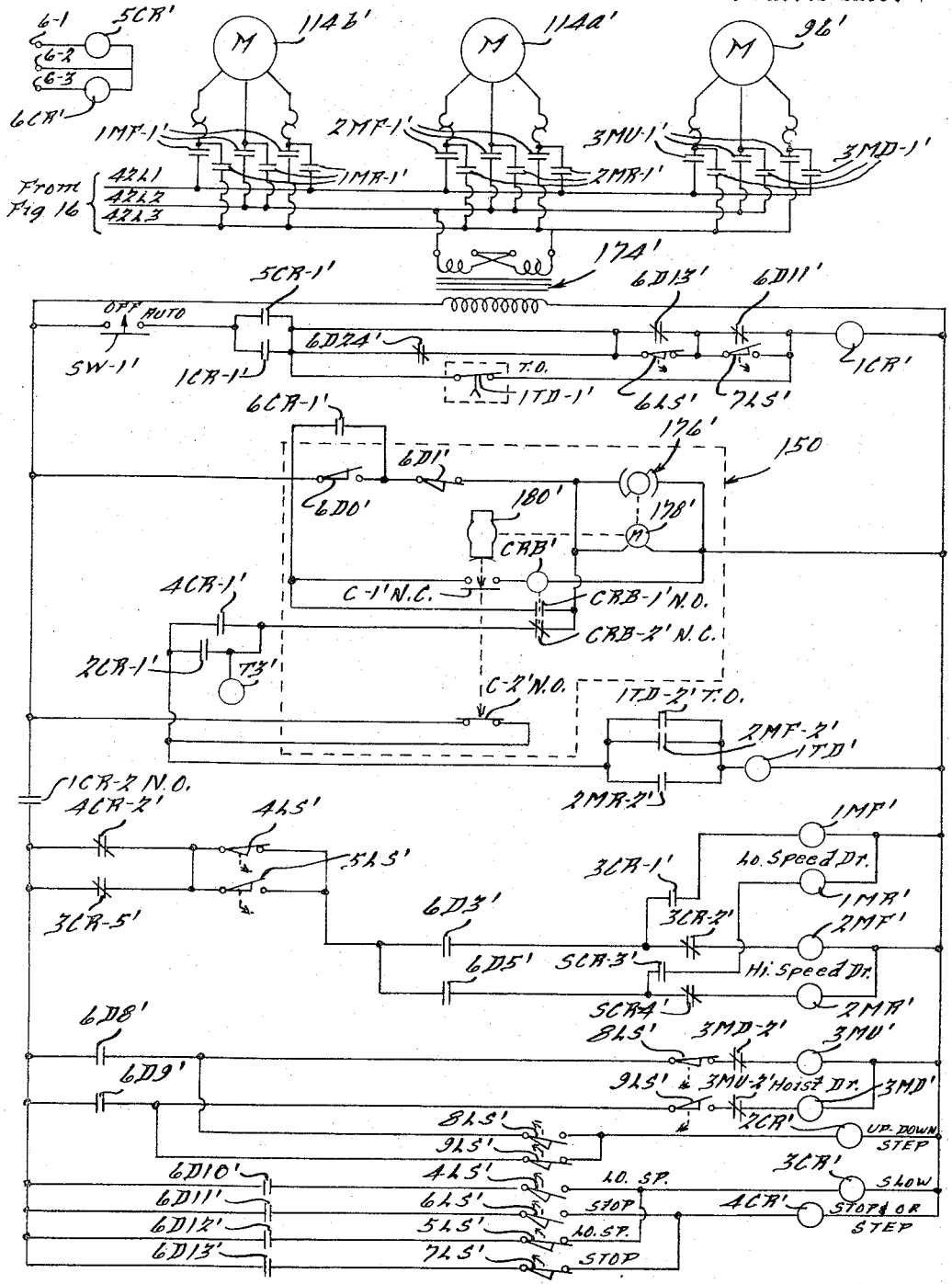

United States Patent Office 3,338,437
Patented Aug. 29, 1967

3,338,437
CONTROL SYSTEM FOR CONVEYING APPARATUS
John V. Davis, Grosse Pointe Farms, Mich., and Frank B. Walsh, Jr., Springfield, Ohio, assignors to The Udylite Corporation, Warren, Mich., a corporation of Delaware
Filed Mar. 31, 1965, Ser. No. 444,303
23 Claims. (Cl. 214—86)

ABSTRACT OF THE DISCLOSURE

A control system for a conveying apparatus of a type consisting of one or more independently movable carriages supported on a rail extending along a series of treating stations, and wherein each carriage has one or more independently movable lift mechanisms thereon for depositing and removing racks with workpieces at the stations. In one embodiment, the programing device on the carriage for providing sequentially-phased movement of the carriage and lift mechanisms is advanced by an indexing motor which is actuated in response to the tripping of sensing devices on the carriage indicating the position of the carriage relative to the stations and the up and down position of the lift mechanism. The programing devices of each carriage are interlocked to maintain them in sequence and a timer is employed to control the operating cycle duration. In an alternate embodiment, the advancement of the programing device is achieved mechanically in response to the carriage travel and the tripping of the lift mechanism sensing devices.

---

The present invention broadly relates to a work-handling apparatus, and more particularly to an improved control system for a conveying apparatus of the so-called straight-line type employing one or a plurality of carriages which are independently movable with respect to each other along an aligned series of treating stations and which carriages incorporate one or a plurality of lift mechanisms thereon providing therewith an automatic transfer of workpieces through the treating stations in a preselected ordered sequence.

Work handling apparatuses of the general type to which the present invention is applicable, are in widespread commercial use for automatically transporting workpieces between successive manufacturing or treating operations. Conveying apparatuses of this type have been found particularly suitable for conveying workpieces automatically through a sequentially phased chemical treating process which frequently includes one or more electro-chemical or electroplating operations. In conveying apparatuses of the type to which the control system comprising the present invention is applicable, one or a plurality of work carriages are mounted on suitable rails or tracks extending along a series of treating stations which are independently driven and independently movable with respect to each other. Each work carriage incorporates one or a plurality of lift mechanisms thereon including work-engaging means for independently raising and lowering the workpieces or work racks on which the workpieces are suspended into and out of the treating stations disposed therebelow. The longitudinal travel of each carriage and the elevating and descending movement of each of the lift mechanisms thereon are automatically controlled so as to provide a preselected transfer of the workpieces from one station to the next succeeding station in a preselected ordered sequence.

In conveying apparatuses of the foregoing type, it is frequently desirable to employ a cell-type plating operation along certain portions of the treating stations and a conventional sequential transfer of the work racks through other portions of the treating stations, consistent with the specific treatment such as an electroplating operation to be performed. In machines of considerable length requiring a large number of work carriages each incorporating at least one lift mechanism thereon, the controls for providing an automatic and independent movement of the work carriages and the lift mechanisms thereon becomes relatively complex which is further aggravated by the necessity of providing means to assure coordination of the several work carriages to avoid physical conflict therebetween along those portions of the treating stations where an overlapping movement of adjacent work carriages occurs. Control systems of the type heretofore known have been found inadequate in providing the requisite flexibility and versatility to permit modifications in the operating sequence of the several machine components as is required from time to time to adapt the work-handling apparatus to an alternative operating cycle. Additionally, control systems of the type heretofore known are further characterized by their relatively cumbersome circuitry requiring a multitude of operative components, substantially increasing the susceptibility of malfunction of the control system as well as increasing the difficulty of servicing the control system and effecting desired modifications in the operating cycle provided thereby as may be required from time to time.

It is according a primary object of the present invention to provide an improved control system for a conveying apparatus which overcomes the problems and disadvantages of control systems of the types heretofore employed in conveying apparatuses of similar type.

Another object of the present invention is to provide an improved control system wherein each work carriage incorporates a self-contained circuit for controlling the longitudinally travel thereof and actuation of the lifting mechanisms thereon relative to adjacent carriages, each of which in turn are interlocked through a central control system.

Still another object of the present invention is to provide an improved control system for a conveying apparatus which substantially simplifies the circuitry as well as eliminating a substantial number of the components required for effecting a controlled automatic sequentially phased operation of each of a plurality of work carriages.

A further object of this invention is to provide an improved control system for a conveying apparatus which is more versatile than systems of the types heretofore known enabling modifications to be made in the programed movement of the work carriages in order to adapt them to alternate processing cycles without encountering a great deal of difficulty or sustaining excessively long machine down time periods for effecting the modification.

Yet still another object of the present invention is to provide an improved control system for a work-handling apparatus wherein the programing device is mechanically advanced in response to operating movements of the work carriage and/or hoist mechanisms thereon.

As still further object of the present invention is to provide an improved control system which is of simple design, of versatile and durable operation, of economical manufacture, of simple maintenance and service, and of efficient and reliable performance.

The foregoing and other objects and advantages of the present invention are achieved by providing each of a plurality of work carriages with a control circuit incorporating individual programming means thereon which are programmed so as to provide a preselected operating sequence of the reversible drive means on the carriage and the lift means on the carriage, effecting automatic and independent movement of each carriage along a series of treating stations as well as independent raising and lowering movement of the lift means in order that workpieces can be selectively deposited and removed from the aligned series of treating stations. In accordance with one embodiment of the present invention, the programming means in each carriage control circuit is indexed in response to sensing means on the carriage which are actuable by cooperating means disposed at spaced intervals along the path of travel of the carriage in response to the travel of the carriage. In accordance with a preferred version of the foregoing embodiment, two separate pairs of sensing means are provided on each carriage which coact with two separate pairs of actuating means alternately disposed at spaced intervals along the conveying machine frame which, consistent with the preselected program, are operative to effect a slow down of the carriage drive means on approaching a station and a subsequent de-energization of the drive means as well as an indexing of the programming means. The programming means is effective to render selected ones of each pair of sensing means inoperative to effect a slow down and de-energization of the drive means, thereby continuing the travel of the carriage to a selected treating station. In accordance with an alternative embodiment of the present invention, the programming means on each carriage is mechanically indexed in response to coaction with suitable actuating means disposed along the path of travel of the carriage. In each embodiment, a central control system is provided which, through suitable sensing means disposed at selected locations along the conveying machine frame, is operative to interlock the movement of the several carriages, preventing the initiation of a successive operative cycle of either of the carriages or a further continuance of a specific operating cycle until each of the carriages has completed a prescribed portion of its operating cycle. It is also contemplated within the scope of the present invention that a master cycle timer can be provided which is included in the central control system and which can readily be preset for a specific time interval, preventing the initiation of the next operating cycle of the carriages until a preselected time interval has expired, thereby assuring appropriate treating times of the workpieces disposed at the several treating stations.

Other objects and advantages of the present invention will become apparent upon a reading of the following description taken in conjunction with the accompanying drawings, wherein:

FIGURE 1 is a side elevational view of an exemplary conveying apparatus to which the control system comprising the present invention is applicable incorporating two work carriages, one having two independently movable hoist mechanisms and the other having a single hoist mechanism;

FIG. 2 is a plan view of the conveying machine illustrated in FIGURE 1;

FIG. 3 is an enlarged side elevational view partly in section of a two-hoist work carriage illustrated in FIGURES 1 and 2;

FIG. 4 is a transverse vertical sectional view of the machine illustrated in FIGURE 3 and taken along the line 4—4 thereof;

FIG. 5 is an enlarged fragmentary transverse sectional view illustrating the relationship of the limit switches on the work carriage and the slow down and stop cams on the machine frame;

FIG. 6 is a fragmentary longitudinal sectional view illustrating the stop cam and slowdown cams as shown in FIGURE 5 and taken along the line 6—6 thereof;

FIGS. 7–14 are schematic side elevational views illustrating the sequential movement of the work carriages and the actuation of the hoist mechanisms thereon to effect an automatic transfer of work racks through the treating stations of a machine as typically illustrated in FIGURES 1 and 2;

FIG. 15 is a diagrammatic view of the interrelationship of the central control circuit and the operating circuit of each of the two work carriages;

FIG. 16 is a diagrammatic view of the central control circuit of the machine;

FIGS. 17a and 17b are diagrammatic views of the circuitry of the double hoist carriage;

FIG. 18 is a diagrammatic circuit diagram of the control circuit of the single-hoist carriage;

FIG. 19 is a fragmentary perspective view of an alternative satisfactory embodiment of the present invention wherein advancement or indexing of the programming device is achieved mechanically in response to the travel of the carriage;

FIG. 20 is a fragmentary perspective view illustrating an alternative mechanical drive mechanism from that shown in FIGURE 19; and FIG. 21 is a diagrammatic view of a control circuit of the single-hoist carriage employing a mechanically driven programming device of the types shown in FIGURES 19 and 20.

Figure 17B:
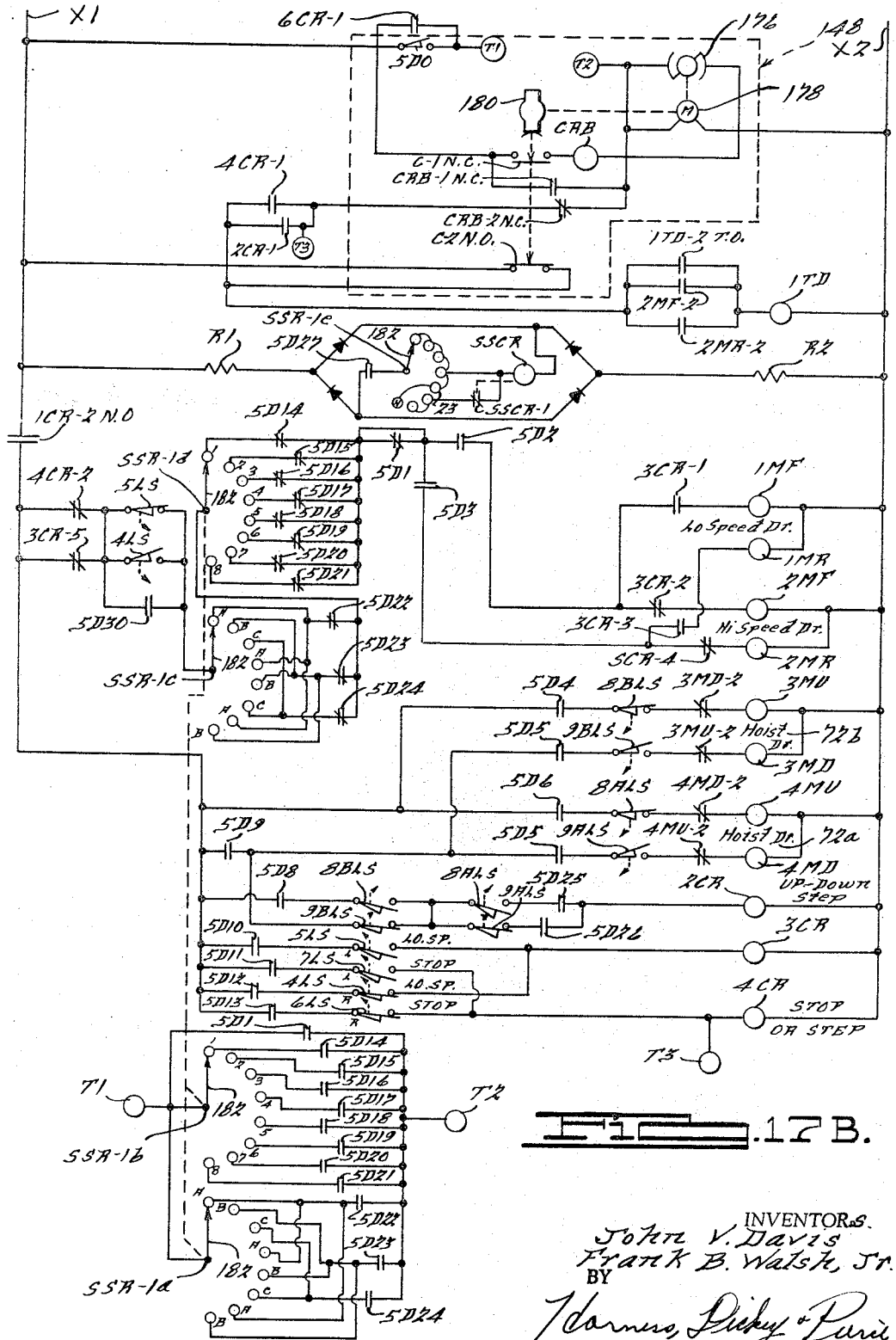

Referring now in detail to the drawings and as may be best seen in FIGURES 1–4, an exemplary conveying machine of a so-called straight-line type is illustrated, which in the typical embodiment shown incorporates a dual-hoist carriage 40 and a single-hoist carriage 42. The carriages 40 and 42 are movably supported on a pair of longitudinally extending rails 44 which are supported in spaced substantially parallel relationship by means of a series of longitudinally spaced inverted U-shaped frames 46. The rails extend continuously above a series of aligned work stations including a load station indicated at L in FIGURE 1, a series of work or treating stations designated as S1 through S19 inclusive and an unload station indicated at U at the right-hand end of the machine as viewed in FIGURES 1 and 2. In the typical embodiment illustrated in FIGURES 1 and 2, the load station may comprise a suitable shop conveyor 48 to which work racks are transferred and are removed therefrom by the carriage 40 for processing through the treating sequences consisting of stations S1–S19. The unload station U similarly may comprise a shop conveyor 50 to which the work racks, after completion of their treating sequence, are transferred by the carriage 42 and along which shop conveyor the work racks are conveyed to a succeeding manufacturing operation.

For the purposes of illustration, the treating sequence may comprise an electroplating operation through which workpieces, after having been appropriately cleaned and rinsed in a previous pre-treatment cycle, are conveyed by means of the load conveyor 48 to the load station L at the input end of a multiple station tank 52. The multiple station tank 52 comprising stations S1–S8 may contain, for example, a semi-bright nickel plating solution followed thereafter by a cold-rinse tank 54, defining station S9. The cold-rinse tank 54 is followed by a three-station tank 56 which may contain a bright nickel plating solution and defines treating stations S10–S12. Station S13, as defined by single station tank 58, may contain a supplemental bright nickel plating solution Dur-Ni followed thereafter by single-station cold-rinse tank 60 at station S14. Station S15 may conveniently be an inspection station at which an examination of the plating on the surfaces of the workpieces is provided.

Following the inspection station S15, an acid dip tank 62 is provided at station S16, followed by single-station cold-rinse tanks 64 and 66 at stations S17 and S18, respectively. A single-station tank 68 is provided at station S19 which may suitably contain a chromium plating solution from which the work racks upon removal from station S19 and deposit on the unload conveyor 50 may conveniently be transferred to suitable rinse tanks including a deionized water rinse followed by drying. By virtue of the versatility and flexibility provided by the improved control system comprising the present invention, any one of a variety of process sequence can be automatically programmed into the conveying machine to effect an automatic sequentially phased transfer of the work racks through any desired number of work stations employing a requisite number of work carriage to provide continuity of work flow.

The structural features of the conveying machine will now be described with particular reference to FIGURES 3 and 4 of the drawings. It will be understood that a detailed description of the dual-hoist carriage 40 as shown in these figures is equally applicable to the single-hoist carriage 42 or other carriages as may be required incorporating one, two or more hoist mechanisms thereon. As shown in FIGURES 3 and 4, the dual-hoist carriage 40 comprises a rectangular framework 70 which serves as a platform on which the drive means for the carriage and for the hoist mechanisms are mounted. The carriage 40 is provided with two lift mechanisms 72a, 72b, disposed in spaced longitudinal relationship and comprising pairs of vertical guide members 74 affixed to the rectangular framework 70 between which lift members 76a, 76b extend. Each lift member comprises a pair of end members 78 to the outer faces of which shoes 80 are affixed which in turn are disposed in sliding relationship along the inner faces of the vertical guide members 74. The end members 78 are rigidly secured to each other by means of a truss type framework 82 extending therebetween. The lower inner faces of each of the end members 78 are provided with an engaging lug 84 which, in the exemplary embodiment shown, is of a V-shaped cross section for engaging an appropriate projection at each side of a work carrier 85, enabling its suspension from the lift member and the transfer of the work carrier and work rack suspended therefrom from one station to the next in response to the longitudinal travel of the carriage.

Movement of the lift members 76a, 76b to and from a raised position and a lowered position is achieved by means of a pair of continuous lift elements or chains 86 having the ends thereof securely fastened to the upper and lower ends, respectively, of each of the end members 78. Each of the lift chains 86 extends upwardly and is trained over an idler sprocket 88 rotatably mounted on the upper end of the vertical guide member 74. The chain 86 thereafter is trained around a driving sprocket 90 affixed to the ends of a cross shaft 92 extending transversely of the carriage 40. The lower portion of the chain is trained around an idler sprocket 94 rotatably mounted on the lower end portion of each of the vertical guide members 74. The rotation of the cross shaft 92 is achieved by a reversible lift motor 96 mounted on the platform formed by the rectangular framework 70 which preferably is drivingly coupled to a suitable gear reducer 98 provided with a driving sprocket 100 on the output shaft thereof. A drive chain or belt 102 is trained around the driving sprocket 100 and around a driven sprocket 104 affixed to the central portion of the cross shaft 92. In accordance with this arrangement, the energization of the reversible lift motor 96 effects rotation of the cross shaft in either direction with a corresponding lifting or lowering movement of the lift member attached thereto. It will be appreciated that each lift mechanism 76a, 76b is controlled by a separate reversible lift motor 96, whereby independent lifting and lowering movement of the lift members is achieved in accordance with the central control system.

In order to signal the control circuit when a lift member has attained the fully elevated position, an up-position limit switch 8ALS and 8BLS (FIGURE 4) is provided for the lift mechanisms 72a, 72b, respectively. The up-position limit switches are mounted at the upper end of the vertical guide members 74 and are adapted to be actuated by one of the end members 78 of each of the lift members as the lift members approach the fully elevated position. Similarly, the down position of the lift members 76a, 76b, is signaled to the control circuit of the carriage by limit switches 9ALS, 9BLS for the lift mechanism 72a and 72b, respectively. The down-position limit switches 9ALS, 9BLS are mounted adjacent to the lower end of the vertical guide members 74 and are actuated by the adjacent end member 78 as the lift members approach the down-position. The reversible lift motor 96 is deenergized in response to the tripping of the up-position and down-position limit switches, which also is effective to signal the carriage control circuit that the completion of a work operation of the carriage has been accomplished.

The carriage 40, as shown in FIGURES 3 and 4, is movably supported by means of a pair of idler rollers 106 at one end thereof and a pair of drive rollers 108 affixed to the ends of a drive shaft 110 rotatably supported in bearing blocks 112. Rotation of the drive shaft 110 in either direction is achieved by a pair of reversible drive motors 114a, 114b which are mounted on the platform formed by the rectangular framework of the carriage and which are drivingly coupled to a gear reducer 116 having its output shaft thereof drivingly connected to a drive chain 118 which is drivingly coupled to a driven sprocket 120 affixed to the drive shaft 110. Accordingly, energization of one of the drive motors 114a, 114b in one direction or the other effects longitudinal movement of the carriage 40 in the desired direction along the rails 44.

The reversible drive motors 114a, 114b for effecting longitudinal travel of the carriage preferably are of high and slow speed, respectively, and are energized alternatively, permitting a slowdown in the speed of travel of the carriage as it approaches a station at which the carriage is to stop, avoiding thereby an abrupt deceleration of the carriage and a corresponding avoidance of any swinging movement imparted to the work rack suspended therefrom. Alternatively, a two-speed reversible motor drive motor or other suitable drive source can be statisfactorily employed. In process where the inertia of the workpieces or the speed of travel of the carriages is not great, a single-speed reversible drive mechanism can be satisfactorily employed such as, for example, in the embodiment shown in FIGURE 21. The energization of the reversible drive motors and the movement of the shuttle carriage in the proper direction along the supporting rails is achieved in accordance with the programmed sequence of the control circuit. The selective energization and de-energization of the drive motors 114a, 114b and subsequent de-energization of the slow-speed motor 114b, effecting a stoppage of the carriage such that one of the lift mechanisms thereof is in vertical alignment with the work rack supports indicated at 122 in FIGURES 1–4, is achieved by suitable sensing means on the carriage and cooperating means on the machine frame which are coordinated to effect a signalling of the control system of the arrival of the carriage at the appropriate station.

In accordance with a typical embodiment of sensing means for effecting a controlled slowdown and stoppage of the carriage, two pairs of limit switches are provided which are actuable by cams on the machine frame as is best illustrated in FIGURES 5 and 6. As shown in FIGURES 5 and 6, a support plate 124 is mounted by means of an L-shaped bracket 126 to the side surface of one of the supporting rails 40 at preselected longitudinally spaced intervals along the machine. To the underside to the support plate 124 is affixed a slowdown cam 128R and a stop cam 130R in spaced transverse relationship. Adjacent support plates 124 are provided with a slowdown cam 128L and a stop cam 130L as shown in phantom in FIGURE 5. The suffix letter "R" and "L" as employed in connection with the slowdown cams and stop cams refers to the relative right position and left position of the cams as viewed in FIGURE 5, and these cams continuously alternate from one support plate to the next support plate in order to actuate the respective set of limit switches on the carriage 40, as will be hereinafter described.

As will be noted in FIGURE 6, the slowdown cam 128R is of a longitudinal length substantially greater than the stop cam 130R in order that the actuation of the slowdown limit switch occurs at a preselected distance from the point of desired stoppage of the carriage, enabling a reduction in its speed of travel to a preselected slower speed before the stop limit switch is actuated by the stop cam. The slowdown cam 128R extends beyond the ends of the stop cam 130R in both directions to provide the necessary slowdown operation regardless of the direction from which the carriage moves toward the intended stop position.

The carriage 40, as shown in FIGURE 5, is provided with a bracket 132 on which two pairs of limit switches are mounted, each provided with actuator arms 134 adapted to coact with the appropriate slowdown cam or stop cam disposed in vertical alignment therewith. In the exemplary embodiment shown, a right stop limit switch 6LS and a right slowdown limit switch 4LS are mounted in side-by-side relationship and are actuable, respectively, by the right stop cam 128R and right slowdown cam 130R. Similarly, a left stop limit switch 7LS and a left slowdown limit switch 5LS are mounted in side-by-side relationship and offset to the left of switches 6LS and 4LS so as to be actuated by left stop cam 130L and right slowdown cam 128L, respectively. It accordingly will be apparent from the relationship as illustrated in FIGURE 5 that the left and right slowdown and stop limit switches will be alternately actuated in response to the longitudinal travel of the carriage along the rails 44. The specific placement of the slowdown and stop cams is governed by which hoist mechanism is to be positioned in alignment with a particular station, and this relationship is maintained to assure appropriate slowdown and stoppage of the carriage with the appropriate lift mechanism in alignment with the work supports 122 at the station at which a work carrier is to be lifted or deposited.

It will be understood that when a single-speed drive motor is employed in lieu of a two-speed drive motor, the slowdown sensing means or limit switch and the slowdown actuator or cam can be dispensed with. It is also contemplated within the scope of the present invention that only a single pair of slowdown and stop limit switches or alternative satisfactory sensing means can be employed in lieu of two alternating pairs, providing that a suitable time-delay timer is incorporated in the control circuit which includes a contact disposed in parallel around the slowdown and stop limit switch contacts, and which time-delay timer is energized concurrently with the energization of the drive motor. The time-delay timer accordingly times out a preselected time-delay period which is sufficient to enable the carriage to move from its original position such that the stop and slowdown limit switches, or the stop limit switch in the case of a single-speed drive motor is released from the actuators or cams disposed at the prior station. After the stop and slowdown limit switches have been released, their appropriate contacts close, completing the circuit and maintaining the drive motor energized. At the completion of the time-delay period, the time-delay timer thereafter opens its contact, whereupon subsequent actuation of the slowdown and stop limit switches and the opening of their contacts provides for the appropriate slowing down and deenergization of the drive motor or, alternatively, an indexing of the programming device on the carriage to its next program step.

In order to provide an interlocking relationship between the carriage 40 and the single-hoist carriage 42, to avoid a collision therebetween at overlapping sections of travel of the two carriages along the supporting rails, sensing means such as a check limit switch TLS-2 is mounted at station S2 as shown in FIGURE 5 for checking the position of carriage 40 relative to carriage 42 to assure that each has completed a prescribed portion of its operating sequence. For example, in the exemplary arrangement as illustrated in FIGURE 5, a check cam 136 is mounted on the bracket 132 of the carriage 40 which is operative to actuate the actuator arm 134 of check limit switch TLS-2 mounted at station S2, as well as check limit switch TLS-9 (FIGURE 1) mounted at station S9, which prevents further movement of the carriage until a corresponding check limit switch TLS-14 (FIGURE 1) mounted at station S14 has similarly been actuated by a similar check cam on the single-hoist carriage 42. The interlocking relationship of the check limit switches of the two carriages in accordance with the circuitry subsequently to be described, avoids any conflict between the two carriages along the overlapping portions of their travel on the rails 44.

In order to facilitate the understanding of the automatic control system comprising the present invention, a typical operating sequence of the carriages 40 and 42 and the lift mechanism thereon will now be described in connection with the sequence diagrams illustrated in FIGURES 7–14, inclusive. The diagrammatic illustration as shown in FIGURES 7–14 corresponds to the tank and treating stations in accordance with the machine layout illustrated in FIGURES 1 and 2. The positions of the carriages 40 and 42 are shown in FIGURE 7 at the beginning of an operating cycle. At the initiation of the operating cycle, the carriages 40 and 42 are moved from the positions as shown in solid lines in FIGURE 7 to the positions as shown in phantom, and whereupon work rack R2 located at the load end of the machine is raised to the elevated position as shown in phantom and the work rack R14 is elevated by the carriage 42 to the raised position as shown in phantom. Carriage 40 thereafter is moved from the position as shown in phantom in FIGURE 7 to the position as shown in solid lines in FIGURE 8 wherein the work rack R3 is moved from the lowered position to the raised position as shown in phantom. During the interim, carriage 42 moves from the position as shown in phantom in FIGURE 7 to the position as shown in solid lines in FIGURE 8 wherein rack R14 is deposited at station S14. During the next operating step, the carriage 40 is advanced from the position as shown in FIGURE 8 to the position as shown in FIGURE 9 wherein the work rack R2 is disposed above station S1 previously vacated by the lifting of rack R3 and subsequently is lowered to the position as shown in phantom, commencing a preselected treatment in the multiple-station tank encompassing stations S1–S8 inclusive. During the meantime, carriage 42 with its lift mechanism in its lowered position moves from the position as shown in solid lines in FIGURE 8 to the position as shown in solid lines in FIGURE 9 wherein rack R15 is lifted out of station S15 and is transferred to and deposited at station S16 as illustrated in phantom.

Carriage 40 holding rack R3 in the raised position as shown in FIGURE 9 thereafter is advanced to the position as shown in FIGURE 10 above station S9 at which rack R3 is lowered from the raised position to the lowered position as shown in phantom. The carriage 42 similarly moves from the position as shown in phantom in FIGURE 9 above station S16 with its lift mechanism in its lowered position to the position as shown in FIGURE 10 in solid lines above station S14 and removes rack R14 from station S14 and deposits it at station S15 as shown in phantom. Carriage 40 thereafter is advanced from the position as shown in FIGURE 10 to the position as shown in FIGURE 11 wherein rack R3 is removed from the tank at station S9 to an elevated position as shown in phantom. Carriage 42 on the other hand moves from the position as shown in phantom in FIGURE 10 to the position as shown in solid lines in FIGURE 11 above station S16 at which rack R15 is lifted and advanced and deposited at station S17 as shown in phantom.

Subsequently, carriage 40 is moved from the position as shown in FIGURE 11 to the position as shown in FIGURE 12 at which rack R11 at station S10 is withdrawn from the lowered position to the raised position as shown in phantom. Carriage 42, after performing a quick-dip operation, as shown in phantom in FIGURE 11 above station S17, is advanced to the position as shown in solid lines in FIGURE 12 above station S18, at which rack R14 is deposited from the raised position to the lowered position as shown in phantom. Thereafter, carriage 42 is advanced from the position as shown in solid lines in FIGURE 12 to the position as shown in phantom wherein rack R16 is withdrawn from the tank at station S19 to the raised position illustrated in phantom.

Carriage 40 is thereafter moved from the position as shown in FIGURE 12 to the position as shown in FIGURE 13 and in which position rack R3 is deposited at station S10 as shown in phantom while rack R11 is retained in the elevated position. Carriage 42 during its course of operation is thereafter moved to the position as shown in FIGURE 13 and in which position rack R3 is deposited at station S10, as shown in phantom, while rack R11 is retained in the elevated position. Carriage 42 during its course of operation is moved from the position as shown in phantom in FIGURE 12 to the position as shown in solid lines in FIGURE 13 at which rack R16 is deposited at the unload station U. Carriage 42 thereafter moves to the position as shown in phantom in FIGURE 13 above station S18 from which rack R14 is removed to a raised position as shown in phantom.

On moving from the position as shown in FIGURE 13 to the position as shown in solid lines in FIGURE 14, carriage 40 is advanced such that rack R11 retained thereby is deposited in station S13 as shown in phantom, after which carriage 40 is returned to its original position above stations S1 and S2 shown in phantom and corresponding to the position as shown in solid lines in FIGURE 7. Carriage 42, on completing its operating cycle, moves from the position as shown in phantom in FIGURE 13, carrying work rack R15 thereon to a position above station S19 at which rack R15 is deposited, and thereafter carriage 42 moves to a position as shown in phantom above station S14 corresponding to its starting position as shown in solid lines in FIGURE 7.

In accordance with the foregoing operating sequence, carriage 40 is thereafter operative to remove the next successive work rack such as rack R1 shown in FIGURE 14 from the load conveyor and extract rack R4 from station S2 of the multiple-station cell-plating tank at which rack R1 is deposited. The withdrawn rack R4 is subsequently conveyed by carriage 40 to station S9 from which it is subsequently withdrawn and deposited at the second station S11 of the three-station cell tank encompassing stations S10–S12. The withdrawn rack R12 from station S11 is subsequently deposited at station S13 from which it is thereafter removed by carriage 42 and passed through stations S14, S15, S16, S17, S18, S19 and finally to the unload conveyor. The programmed sequencing of carriage 40 is such that a rack sequentially will be removed from successive stations of the first cell-plating tank and comprising stations S1–S8, and thereafter successively deposited in one of the three stations of the three-station cell-plating tank encompassing stations S10–S12 while the rack thus removed is conveyed by means of carriage 42 through the balance of the rinse stations and thence to the unload conveyor. It will be appreciated that any one of a variety of alternative cell plating and/or successive transfers of work racks through each station of a process can be selectively achieved in accordance with any desired sequence employing one or a plurality of work carriages each having one or a plurality of hoist mechanisms thereon in order to achieve the requisite speed and work-handling capacity as desired. In either event, the control system comprising the present invention is readily adaptable for providing the requisite integrated and coordinated automatic cycling of each carriage and of each lift mechanism thereon consistent with the desired process cycle.

The programming of each of the work carriages is achieved by a control circuit incorporated on a control panel carried by each carriage and wherein each of the carriage circuits are interlocked with a central control circuit disposed in a stationary panel convenient to the machine operator. The foregoing relationship is diagrammatically illustrated in FIGURE 15 wherein a central control panel 138 is electrically connected by means of cables 140 and 142 to control panels 144 and 146 mounted on and carried by carriages 40 and 42, respectively. The cables 140, 142 may be suitably supported above or along the machine frame with sufficient slack to enable each carriage to move between its extreme longitudinal positions along the supporting rails or, alternatively, a trolley contactor-type busway rail system can be employed of the types well known in the art for maintaining continuous electrical contact between the central control circuit and the carriage control circuits as carried in the panels 144, 146. In either event, the cables 140, 142, as illustrated in FIGURE 15, supply each carriage control circuit with the current necessary for driving the lift motors of each hoist mechanism as well as the drive motors for effecting longitudinal movement of the carriage. In addition, these cables include the control circuit wiring which interlocks the two carriages to assure that each has completed a preselected portion of its cycle as signalled by the several check limit switches disposed at certain stations.

Each carriage control circuit incorporates a suitable programming device which is operative to control the energization and de-energization of the carriage drive motors and the reversible lift motors such that each carriage undergoes a preselected operating cycle. Any one of a variety of suitable programming devices can be satisfactorily employed for this purpose which can be provided with a program of successive steps in accordance with the specific processing cycle desired. Programming devices which are suitable for this purpose include magnetic tape programmers which can be provided with an endless tape on which the entire operating cycle is stored. Alternatively, perforated tape programming devices including optical or electrical scanning devices can also be satisfactorily used. In the exemplary embodiment as illustrated in FIGURE 15 and as described in connection with the control circuit illustrated in FIGURES 17a, 17b and 18, a rotary sequencing or stepping drum is employed such as the stepping drums 148 and 150 in the carriage control panels 144 and 146, respectively. Stepping drums of the foregoing type are well known in the art and are available from the Tenor Company of Butler, Wis., and comprise a perforated drum which is rotatably mounted and can be appropriately programmed by the selective positioning of a series of pegs or cams 152 along the periphery thereof which, in response to progressive rotation or stepping of the drum, are operative to selectively actuate switches of a series of program switches disposed therebelow. As will be noted in FIGURES 17a, 17b and 18, several of the program switches include more than one contact to provide the desired action. The sequential arcuate movement of the stepping drum from one position to the next position is achieved by a suitable drive mechanism 154 which preferably is of the well-known Geneva type, effecting positive movement of the stepping drum from one position to the next position angularly spaced therefrom. The individual stepping drums can be readily changed in order that a quick and simple modification can be made in the operating cycle of the carriage as may be desired to provide an alternative processing cycle.

In order to further illustrate the control system of a conveying machine as illustrated in FIGURES 1 and 2 in connection with an operating cycle as illustrated in FIGURES 7–14, a description of the electrical circuitry as embodied in the central control panel and each of the carriage control panels will now be made in accordance with the wiring diagrams illustrated in FIGURES 16–18.

In order to facilitate an understanding of the wiring diagrams as shown in FIGURES 16–18, the following nomenclature has been adopted for the various components of the circuits: limit switch, LS; control relay, CR; motor contactor, MC; timer coil, TR; timer motor, TM; time delay, TD; stepping switch relay, SSR; drive motor reversing contactor coils, MF forward and MR reverse; hoist motor reversing contactor, MU upwards and MD downwards. The appropriate contacts controlled by the several coils, contactors and relays are indicated by the specific relay or contactor with a numerical suffix for each contact controlled thereby.

The main control circuit as contained in the control cabinet 138 (FIGURE 15) conveniently mounted at the master control area for access by the machine operator includes a main disconnect switch 156 to which current is applied by means of lines L1, L2 and L3 supplying 440 volts of three-phase 60-cycle alternating current to the control panel. Accordingly, the closing of main disconnect switch 156 effects a supply of electrical power to the main control transformer 158 supplying a control voltage to the control components contained in the main control circuit. At the same time, three-phase alternating current is conveyed to motor contactor contacts CM5–2 and CM6–2 which are disposed in series with power cables 140 and 142 (FIGURE 15) supplying electrical energy to carriages 40 and 42 respectively. Energization of the main control circuit is achieved by depressing the "on" push button 160 of master start switch 162 which effects an energization of main control relay MCR which closes its holding contact MCR–1 and its power contact MCR–2 and an indicator light 164 is illuminated, visually signalling the operator of the energization of the main circuit. After the closing of contact MCR–2, individual carriage "on" push buttons on the main control panel of start switches 166 and 168 for carriages 40 and 42, respectively, are depressed effecting energization of motor contactors CM5 and CM6 which in turn close their holding contacts CM5–1 and CM6–1 maintaining the contactors energized after the release of the "on" push buttons. The energization of motor contactors CM5 and CM6 is visually indicated by signal lights 170 and 172, respectively, on the main control panel. In response to energization of contactor CM5 and CM6, contacts CM5–2 and CM6–2 are closed, supplying three-phase 60-cycle 440-volt current to the cables 140 and 142 (FIGURE 15) to the control panels of carriages 40 and 42, respectively.

At the initiation of an operating cycle and with carriage 40 and carriage 42 in the position as shown in solid lines in FIGURE 7, the lift mechanisms 72a and 72b of carriage 40 are disposed above stations S2 and S1, respectively, while the lift mechanism of carriage 42 is disposed above station S14. In that position, the stepping drum 148 of carriage 40 (FIGURE 15) and a stepping drum 150 of carriage 42 (FIGURE 15) are in a standby or so-called "home" position preparatory to the initiation of the next operating cycle. Assuming that a sixty-position stepping drum is employed in each of the carriage control panels, the drum can be conveniently programmed such that step 60, or the last step thereof, is the home position. At the same time, the check cam 136 (FIGURE 5) on carriage 40 has actuated check limit switch TLS–2 while a corresponding check cam on carriage 42 has actuated limit switch TLS–14 at station S14, signalling the central control circuit that both carriages have completed their operating cycle.

The main control circuit includes a master cycle timer including a coil TR2 and a timer motor TM2. The master cycle timer, as hereinbefore described, is incorporated to assure that the carriages do not initiate a new operating cycle until a preselected time interval has elapsed. In the exemplary embodiment shown for the sequence illustrated in FIGURES 7–14, the master cycle timer may be preset for a time interval of 225 seconds, which assures that at least 225 seconds will elapse between each operating cycle. At the completion of the timing cycle of the master timer TR2, its time closed contact TR2–3 closes, which through closed check limit switch contacts TLS–14 and TLS–2 effects an energization of control relay CR2 which closes its normally open contacts CR2–1 and CR2–2, supplying control current to terminals 5–3 and 6–3 which are connected through cables 140 and 142 to carts 40 and 42, respectively. At the same time, coil TR3 of reset timer is energized, which opens its contact TR3–1 and closes its contact TR3–2, energizing coil TR2 resetting master timer motor TM2. Alternatively, reset timer TR3 can be energized by depressing push button switch PB9, in which case it similarly opens its normally closed contact TR3–1 and closes its normally open contact TR3–2. Upon a releasing of push button switch PB9, coil TR3 is de-energized, whereby its normally closed contact TR3–1 closes and reset timer commences to time out a preselected time period at the expiration of which its contact TR3–2 opens.

During the timing period of reset timer TR3, its contact TR3–2 is closed and coil TR2 is maintained energized, effecting a resetting of master cycle timer TR2. The energization of coil TR2 causes its contact TR2–1 to close and its normally closed contact TR2–2 to open. When reset timer contact TR3–2 opens, coil TR2 of the master timer is de-energized, which effects a closing of its contact TR2–2 starting the master timer motor TM2, whereby the master cycle timer commences to time the preselected time period. Contact TR2–3 remains open during the balance of the timing of the master cycle timer and time closes at the expiration of the preset time period.

The energization of the start control relays 5CR and 5CR' of carriage circuits illustrated in FIGURES 17a and 18, respectively, is achieved by depressing push button switches PB5 and PB6, respectively, on the face of the master control panel which in turn effect a corresponding closing of their contacts 5CR–1 and 5CR–1' in the respective circuit of each carriage. The energization of control relay CR2 and a closing of its contacts CR2–1 and CR2–2 in the main control circuit similarly effects an energization of stepping control relay 6CR as shown in the circuit of FIGURE 17a and 6CR' shown in the circuit of FIGURE 18, whereupon the stepping drum is advanced from the standby or home position to the first operating position in a manner hereinafter described. The de-energization of the entire control system is simply achieved by depressing the "off" push button of master start switch 162, or each carriage can be individually de-energized by depressing the respective "off" push buttons of start switches 166 and 168 for carriages 40 and 42, respectively.

Referring now in detail to the carriage control circuit for carriage 40 as diagrammatically illustrated in FIGURES 17a, 17b, energization of control transformer 174 is achieved through lines 40L2 and 40L3 in response to the closing of contacts CM5–2 (FIGURE 16). The circuits as shown in FIGURES 17a, 17b are electrically connected to each other at junctions X1, X1 and X2, X2, respectively, forming a composite circuit for the dual-hoist carriage 40. The depression of push button switch PB5 (FIGURE 16) in the main control circuit applies current to terminal 5–1, effecting energization of control relay 5CR which closes its contact 5CR–1 through closed switch contact SW–1 positioned in the automatic position and normally closed contacts 5D13 and 5D11 effecting energization of the coil of control relay 1CR. Energization of control relay 1CR effects a closing of its holding contact 1CR–1 in addition to contact 1CR–2 supplying current to the balance of the control circuit. The energization of control relay 6CR in response to the closing of contact CR2–1 (FIGURE 16) results in a closing of contact 6CR–1 which, through terminal T1, energizes contact 1 of stepping switch relay section SSR–1a having its wiper contact disposed in contact with terminal A thereof, which through closed contact 5D22 through terminal T2 of the stepping drum effects a de-energization of the stepping drum brake 176 and an energization of the stepping drum drive motor 178, effecting rotation of the stepping drum from the home position to the first position of the process cycle.

In response to the rotation of the stepping drum, the two-lobe cam 180 is rotated through an angularity of 180° whereby cam contact C-1 closes effecting an energization of the coil of control relay CRB which closes its normally open contact CRB-1 and opens its normally closed contact CRB-2. At the same time, cam contact C-2 is opened. As the cam 180 continues to rotate, it eventually effects a reopening of cam contact C-1 and a closing of cam contact C-2 whereupon the coil of control relay CRB is de-energized and the step of the stepping drum is completed. During the indexing of the stepping drum from the home position, contact 5D22 is opened, whereupon energy to terminal T2 and the brake 176 of the stepping drum is stopped, effecting a re-engagement of the brake and holding the stepping drum in the first position. The subsequent closure to contact 5D22 such as at stepping drum positions 55 through 60 corresponding to the home position of the stepping drum of cart 40 causes a rapid stepping of the drum to the home position until home switch 5D0 is opened.

The stepping drum in position 1, in accordance with the sequence as set forth in FIGURES 7–14 as previously described, provides a programming of carriage 40 such that contact 5D3 is closed, effecting an energization of motor reverse relay 2MR for the high-speed carriage drive motor 114a, whereupon its motor contacts 2MR-1 are closed, whereupon the carriage commences movement from the position as shown in solid lines in FIGURE 7 toward the position as shown in phantom. Carriage 40 accordingly moves in a reverse direction toward the load station L as illustrated in FIGURE 7. At the same time, contact 5D11 is closed in response to the positioning of a peg on the stepping drum placing into the circuit left stop limit switch 7LS, which upon a closing in response to contact with a stop cam 130L (FIGURE 5) causes energization of stop control relay 4CR. Energization of control relay 4CR causes it to close its normally open contact 4CR-1 which through normally closed contact CRB-2 effects simultaneous energization of the stepping drum brake 176 and the stepping drum motor 178, whereupon the stepping drum is indexed to its next position. In position No. 2 of the stepping drum, contact 5D3 remains closed, maintaining reverse motor contact coil 2MR energized such that the high-speed drive motor 114a continues to move the carriage 40 in the reverse direction such that its lift mechanism is advanced toward the load station L. In this position of the stepping drum, contact 5D12 is also closed, placing slow-speed limit switch 4LS in the circuit.

As the carriage 40 and its lift mechanism 72b (FIGURE 3) approaches the load station L, the right slowdown limit switch 4LS is actuated by the slowdown cam, effecting a closing of its contact and an energization of the coil control relay 3CR which in turn closes its normally open contact 3CR-1, opens its normally closed contacts 3CR-2 and 3CR-5, closes its normally open contact 3CR-3 and opens its normally closed contact 3CR-4, effecting a de-energization of motor-reversing contactor coil 2MR resulting in a de-energization of the high-speed drive motor 114a and an energization of the low-speed drive motor 114b through reverse contacts 1MR-1. The carriage 40 accordingly slows down as its lift mechanism 72b approaches vertical alignment with load station L.

Carriage 40 continues until the right stop limit switch 6LS is actuated by the stop cam at the load station effecting a closing of its contact 6LS and an energization of control relay 4CR through closed contact 5D13. Energization of control relay 4CR effects a closing of its contact 4CR-1 effecting a stepping of the stepping drum to its next position in the same manner as previously described. Control relay 4CR also opens its normally closed contact 4CR-2 effecting a corresponding de-energization of low-speed reverse motor relay 1MR which opens its contact 1MR-1 stopping movement of the carriage 40 with the hoist mechanism 72b disposed in vertical alignment above the work rack at the load station L (FIGURE 7).

With the stepping drum in position No. 3, the lift mechanism drive motor 96b for lift mechanism 72b (FIGURE 3) is energized through contactors 3MU-1 which are closed by the energization of the coil 3MU in response to the closing of contact 5D4 whereby the lift mechanism commences its elevating movement and a corresponding removal of the work rack positioned at the load station. When the lift mechanism attains the fully raised position, up-position limit switch contact 8BLS is actuated which through closed contact 5D8 and 9ALS of lift mechanism 72a down-position limit switch and closed contact 5D26 effects energization of lift mechanism control relay 2CR which closes its contact 2CR-1 and through cam contact C-2 and contact CRB-2 effects re-energization of the stepping drum drive motor 178 and a release of the brake 176, whereupon the stepping drum is advanced to position 4.

In accordance with the programming as preset in the stepping drum, the stepping drum is thereafter quick step transferred to position 11 by the closing of contact 5D0 connected to terminal T1, which contact is closed in step positions 4–10 inclusive. The stepping drum accordingly stops after rapid stepping to step 11. The quick step transfer of the stepping drum between steps 4 and 11 is to provide a cell-plating operation in the multiple-station tank 52 comprising stations S1–S8 (FIGURE 1) such that on succeeding cycles the work racks are successively removed from stations S2, S3, S4, etc., until each of the stations has been vacated and replaced by a new work rack, after which the rack at station S1 is again removed and the foregoing cycle is repeated.

When the stepping drum attains position 11, contact 5D2 is closed, which through normally closed contact 3CR-2 effects energization of coil 2MF which closes its contact 2MF-1 effecting energization of the high-speed drive motor 114a in the forward direction, whereupon carriage 40 commences to travel from the position as shown in phantom in FIGURE 7 toward the position as illustrated in FIGURE 8. At the same time, contact 5D10 is closed, placing slow-speed limit switch 5LS in the circuit which upon actuation by the slowdown cam effects an energization of control relay 3CR, which in turn opens its contact 3CR-2 de-energizing the coil 2MF which opens its contact 2MF-1 de-energizing the high-speed drive motor and simultaneously closes its contact 3CR-1 energizing coil 1MF which closes its contact 1MF-1 energizing the low-speed drive motor 114b whereupon the carriage 40 continues to travel in a forward direction at a reduced rate. Further advancement of the carriage effects actuation of the left stop switch 7LS by the stop cam which is placed in the control circuit by the closing of contact 5D11, effecting a closing of its contact 7LS which in turn effects an energization of the coil of control relay 4CR which closes its contact 4CR-1 and causing the stepping drum to step to position No. 12 in a manner as previously described. The energization of control relays 4CR and 3CR also effects an opening of normally closed contacts 4CR-2 and 3CR-5, removing power from the low-speed motor contactor coil 1MF whereby the low-speed motor 114a is de-energized. Step 12 in the exemplary sequence illustrated in FIGURES 7–14 is programmed as a quick transfer whereby the stepping drum through closed contact 5D14 is quick transferred to position No. 13.

In position No. 13, the stepping drum is programmed such that lift mechanism 72a disposed in the down position and positioned in vertical alignment with the rack at station S1 of the multiple treating tank 52 (FIGURE 1)

is energized in response to the closing of contacts 4MU–1, whereupon the lift mechanism commences to move toward the elevated position. Contacts 4MU–1 are closed in response to the energization of up-motor starter coil 4MU through closed contact 5D6 and contact 8AL6. Upon attaining the raised position, the lift mechanism control relay 2CR is energized through closed contacts 5D8, lift up position limit switch contact 8BLS and up-position limit switch contact 8ALS and contact 5D25. Control relay 2CR upon energization, closes its contact 2CR–1 whereupon the stepping drum is step transferred to the next position 14 and then quick transferred through closed contact 5D14 to position 15 in a manner previously described. The stepping of the stepping drum effects an opening of contact 5D6 and a deenergization of coil 4MU whereby the lift motor 96a of hoist mechanism 72a is de-energized.

In position 15 of the stepping drum, carriage 40 is moved forwardly from the position shown in FIGURE 8 to the position shown in FIGURE 9 wherein lift mechanism 72b is disposed in vertical alignment above station S1. The forward travel of the carriage is achieved by the energization of high-speed forward motor contacts 2MF–1 in response to energization of the coil 2MF. The carriage upon approaching this position is slowed down and stopped by the tripping of the slowdown limit switch and stop limit switch in a manner as previously described, and the stepping drum is simultaneously step transferred to position 16.

At position 16, contact 5D9 is closed effecting an energization of lift mechanism 72b down-motor contactor coil 3MD through normally closed contact 5D5, 3MU–2 and switch contact 9BLS of the down-position limit switch, which is in the closed position when unactuated. Lift mechanism 72b accordingly commences its descending movement until down-position limit switch 9BLS is actuated, effecting an opening of its contact 9BLS and de-energizing down-motor contactor 3MB which opens its contacts 3MD–1, de-energizing lift motor 96b. In response to actuation of down-position limit switch 9BLS, the stepping drum is stepped through closed contact 5D9, 9BLS, 8ALS and 5D25, effecting energization of control relay 2CR, which through its contact 2CR–1 effects re-energization of the stepping drum drive motor 178.

The forward drive motor 114a is again energized, whereby carriage 40 commences its high-speed travel from the position as shown in FIGURE 9 toward the position as shown in FIGURE 10 in accordance with the sequence previously described. During the course of the travel of carriage 40 toward station S9, the left slowdown and stop limit switches and right slowdown and stop limit switches are alternatively actuated by the slowdown and stop cams positioned at preselected intervals of the machine. The slowdown limit switches 4LS and 5LS are not placed in the circuit during the travel of the carriage between the intervening stations in view of the continued open condition of contacts 5D10 and 5D12. The stop limit switches, both left and right, are placed in the circuit by the alternative opening and closing of contacts 5D11 and 5D13, whereupon the actuation of the left stop limit switch 7LS and the right stop limit switch 6LS effects a progressive stepping of the stepping drum by the successive energization of the control relay 4CR effecting successive closing of its contact 4CR–1.

It will be apparent from the foregoing that appropriate positioning of the contact pegs on the stepping drum 148 (FIGURE 15) in the control circuit of the carriage 40 effects a sequential movement of the carriage and an independent movement of the lift mechanisms thereon through a treating cycle in accordance with that illustrated in FIGURES 7–14.

In order to overcome any malfunction of a stop cam or stop limit switch, a fail-safe circuit is provided which includes the control relay 1CR in which a time-delay timer 1TD is included and is preset to time a period sufficient to enable either the right stop limit switch 6LS or left stop limit switch 7LS to be released and disengaged from the stop cam. At the expiration of the preset time-delay period, the timer 1TD opens its time-open contact 1TD–1 and time-open contact 1TD–2. The time-delay timer coil 1TD is energized in response to the closing of either the forward of reverse high-speed motor contacts CMF–2 and CMR–2. Accordingly, each time the high-speed drive motor is energized in either direction, the delay timer 1TD is energized by virtue of the closing of cam contact C–2, and thereafter commences to time a short period during which time its contact 1TD–1 is closed and at the expiration of which time period it is opened. During the closed interval of contact 1TD–1, either left stop limit switch contact 7LS or right stop limit switch contact 6LS is closed, thereby maintaining the coil of control relay 1CR energized. For example, when the carriage moves from a right-position limit switch stop cam whereby contact 6LS has been held open, as the carriage moves past and beyond the stop cam, the contact 6LS closes and the stepping drum is advanced and programmed so as to open a corresponding contact 5D11 disposed in parallel with contact 6LS. In the event of a malfunction of left limit switch 7LS or a misalignment of its appropriate stop cam, the carriage would ordinarily continue to travel beyond that station such that the next succeeding right limit switch contact 6LS would again be actuated without an intervening stepping of the stepping drum due to the malfunction. In such event, the actuation of the right stop limit switch contact 6LS effects a de-energization of the control relay 1CR in response to an opening thereof, which in turn effects an opening of contact 1CR–2 which de-energizes all of the motor contactors for carriage 40. A similar fail-safe provision is provided for the left stop limit switch contact 7LS in combination with contact 5D13 disposed in parallel therewith, similarly avoiding the possibility of a failure in the stepping of the stepping drum as a result of the inoperation of the left stop limit switch.

The foregoing operating cycle as programmed on the stepping drum in the control panel of carriage 40 continues until the stepping drum again returns to the home position which, in the exemplary embodiment, corresponds to step 60. Movement of the stepping drum from the home position to the first step again occurs, provided that the master timer has timed out its preset period such that its contact TR2–3 is closed and that both carriages 40 and 42 have attained the positions as illustrated in FIGURE 1 so that its check limit switch contacts TLS–14 and TLS–2 are closed, effecting a re-energization of the coil of control relay CR2 and the coil of reset timer TR3, whereupon the Geneva drive system of the drum is energized, effecting advancement thereof from the home position to the first step. Accordingly, the next operating cycle of carriage 40 commences, but in the second cycle the work rack removed from the load station L is deposited at station S2 of the multiple station tank 52 as shown in FIGURE 1 and the rack removed from station S2 is deposited in the second station S11 of the multiple-station tank 56. Subsequent cycles effect a removal of a rack from station S3 of the multiple-station tank 52 and a depositing thereof at the third station S12 of multiple-station tank 56.

This cycle repeats until each rack in turn is removed from each station of multiple-station tank 52 and deposited in order in the three-station multiple tank 56 in a manner as previously described. To this extent, each cycle of the stepping drum deviates from the preceding cycle with respect to the selection of which work rack is to be removed from the multiple-station tanks, and this selectivity is provided by the use of a conventional telephone-type stepping switch relay which in FIGURE 17b has its component sections designated as SSR–1a, SSR–1b, SSR–1c, SSR–1d and SSR–1e. The wiper contacts 182 of each section of the stepping switch relay section are mechanically coupled to each other, and at the completion of each rotation of the stepping drum contact 5D27 is energized which effects energization of coil SSCR, which upon opening of contact 5D27 effects a mechanical stepping of the stepping switch to the next position. As a result of the stepping switch, each wiper contact 182 is advanced to the next position and remains in that position for the balance of the rotation of the stepping drum during that cycle. Accordingly, the selected switch in the stepping drum mechanism is placed into the circuit such that the carriage 40 undergoes the appropriate cell-plating sequence and a fast transfer over those steps of the two multiple-station tanks at which the racks are to remain undisturbed. Each section of the stepping switch relay, as illustrated in FIGURE 17b, is shown including only eight contacts which are numerically and alphabetically indicated for the purposes of clarity and in actuality include 24 contacts in all wherein common numerical and alphabetical terminals are electrically ganged to each other as is indicated in stepping switch relay sections SSR–1c and SSR–1a. The aforementioned alphabetically indicated contacts of the stepping switch relay sections include three separate ganged terminals each corresponding to the three stations of the multiple station 56 while stepping switch sections SSR–1b and SSR–1d incorporate three sets of 8 terminals each corresponding to stations S1–S8 of the multiple-station tank 52. The drive mechanism for the stepping switch relay including coil SSCR is of the type well known in the art and includes closed normal contact SSCR–1 which provides a fast step transfer of the stepping switch through the unused portion of the contacts thereof.

The control panel 146 (FIGURE 15), and the stepping drum 150 carried thereby, provide an automatic programming of the single lift carriage 42 in accordance with the control circuit illustrated in FIGURE 18. Corresponding components of the control circuit in FIGURE 18 to those previously discussed in connection with FIGURES 17a, 17b are indicated by the same designation with a prime affixed thereto. Since the carriage 42 employs only a single lift mechanism thereby requiring only a single lift motor 96' and does not service any multiple-station cell-plating receptacles, no stepping switch relay is required, and the circuitry therefor is substantially simpler than that previously described in connection with carriage 40. With the exception of the aforementioned deviations, the control circuit of carriage 42, as diagrammatically shown in FIGURE 18, is substantially the same as that previously described in connection with FIGURES 17a, 17b and the operation thereof including the stepping of its stepping drum and the selective energization of the high-speed drive motor 114a' and low-speed drive motor 114b' through the motor contactors and in response to the energization of the left and right stop limit switches 7LS' and 6LS' are identical to that previously described. Accordingly, a detailed description of the control circuit of carriage 42 shown in FIGURE 18 will not be made since the operation thereof is readily understood when viewed in the light of the operating description hereinabove set forth in connection with FIGURES 17a, 17b.

It will also be appreciated that one or more additional work carriages employing one or a plurality of lift mechanisms thereon can similarly be programmed and coordinated by the main control circuit in the same manner as carriages 40 and 42 providing therewith an automatic operation along the entire length of the machine. In each such case an appropriate check limit switch is provided for each carriage which is disposed in series with check limit switch contacts TLS–14 and TLS–2 (FIGURE 16), assuring that all of the carriages have completed their respective operating cycle prior to the stepping of each of their respective stepping drums from the home position to the first operating step.

In accordance with an alternative embodiment of the control system comprising the present invention, a mechanical drive mechanism is employed for effecting stepping of the stepping drum or other alternative programming device in the control panel of each work carriage in lieu of the electrical Geneva drive system as previously described in connection with FIGURES 17a, 17b and 18. By virtue of incorporating such a mechanical drive arrangement, still further simplification of the circuitry is achieved, thereby further enhancing the reliability of the machine. An exemplary drive arrangement suitable for the practice of the present invention is illustrated in FIGURE 19. For the purposes of clarity, the structural components of the carriage have been eliminated and in the case of carriage 42 the control panel 146 is illustrated in phantom. The control panel 146 is secured to the frame of carriage 42 and carries therein the stepping drum 150 which is rotatably mounted on a vertical shaft 184 which is rotatably supported in bearing blocks 186. It will be understood by those skilled in the art that the stepping type drum programming device is employed as an example, and alternative suitable programming devices such as magnetic tape and perforated tape programming devices, for example, can alternatively be satisfactorily employed.

In the exemplary arrangement illustrated in FIGURE 19, the stepping drum 150 incorporates a series of selectively positioned pegs 152 which in response to rotation of the drum are effective to actuate switches D1 through D5 inclusive. The respective switch contacts are diagrammatically illustrated in the wiring diagram as shown in FIGURE 21, which is illustrative of the mechanical drive arrangement illustrated in FIGURE 19 for the single-hoist carriage 42 providing an operating sequence consistent with that hereinbefore described in connection with FIGURES 7–14. A detailed description of FIGURE 21 will subsequently be provided with reference to the mechanical arrangement illustrated in FIGURES 19 and 20.

The shaft 184, as illustrated in FIGURE 19, extends downwardly and out through the base of the control panel 146, to the end of which a cog wheel 188 is affixed having a series of cogs 190 projecting outwardly from the periphery therof. The cogs 190 at transverse sides of the cog wheel 188 project outwardly and in the path of actuators 192 and 194 mounted at longitudinally spaced intervals and on opposite sides of a frame member 196 extending longitudinally along the treating stations and parallel to the path of travel of the work carriage. As will be noted in FIGURE 19, the actuators 192 are pivotally mounted at their lower ends to enable a pivoting thereof in response to coaction with a cog 190 on the cog wheel in a clockwise direction as shown in phantom in FIGURE 19 in response to movement of the carriage toward the right. A stop pin 198 projects from the side of the frame member 196 to prevent the pivoting of the actuator 192 in a counterclockwise direction in response to contact with a cog 190 when the carriage and the cog wheel 188 move toward the left as viewed in FIGURE 19. Each actuator 192 is provided with a pressure coil spring 200 which biases the actuator 192 against the stop pin 198 and in the path of travel of the cogs 190.

The actuators 194 on the opposite side of the frame member 196 are of the same construction as the actuators 192 but are pivotable in the opposite direction in response to coaction with the cogs 190. Accordingly, with the arrangement as illustrated, movement of the carriage toward the right, as viewed in FIGURE 19, effects rotation of the cog wheel in a counterclockwise direction in response to coaction with the actuators 194, while the actuators 192 pivot downwardly to an inoperative position. On the other hand, movement of the carriage toward the left, as viewed in FIGURE 19, also effects counterclockwise rotation of the cog wheel 188 in response to coaction with the actuators 192 while the actuators 194 pivot downwardly to an inoperative position. By virtue of this arrangement, the cog wheel 188 and the stepping drum 150 drivingly connected thereto is always rotated in the same direction, regardless of the direction of travel of the carriage.

The spacing of the cogs 190 is such that, on the actuation by an actuator 192, 194, an advancement of the stepping drum through one step is achieved. In order to hold the drum in an appropriate stepped position, a star wheel 202 is mounted on the shaft 184 and a detent roller 204 mounted on a lever arm 206 which is resiliently biased toward the periphery of the star wheel and prevents inadvertent indexing of the stepping drum. The positioning of the actuators 192, 194 along the frame member 196 is selected such that an indexing of the stepping drum 150 occurs as the carriage approaches each station and whereby, in response to coaction of the cog wheel with one of the two actuators, a stepping of the drum occurs which in accordance with the desired program effects a de-energization of the drive motor, stopping the carriage at a position wherein the lift mechanism thereon is in alignment with the work rack supports at that station. Alternatively, if the program is such that the carriage is to continue its travel beyond that station, the next step on the drum instructs the control circuit and the carriage travel continues.

It is also contemplated within the scope of the present invention that various gear reduction or drive ratios can be mechanically incorporated in the mechanical driving of the stepping drum rather than the direct drive arrangement illustrated in FIGURE 19. For example, an alternative arrangement as illustrated in FIGURE 20 provides for a chain drive of the stepping drum 150 at a selected gear reduction ratio. As shown in FIGURE 20, the cog wheel 188' is affixed to a shaft 184' journaled in bearing blocks 186' to the upper end of which a chain sprocket 208 is affixed and is drivingly connected to a driven sprocket 210 by means of a chain 212. The driven sprocket 210 is affixed to a shaft 213 which is connected to the stepping drum 150 effecting an indexing thereof in response to an angular movement of the cog wheel 188' as it contacts the actuators 192, 194 (FIGURE 19).

Referring now in detail to the wiring diagram as shown in FIGURE 21, a control circuit is provided for the single hoist carriage 42 (FIGURE 1) which in accordance with a mechanical drive arrangement such as illustrated, for example, in FIGURE 19, is programmed to undergo a sequence as set forth in FIGURES 7–14. For the purposes of simplicity, only one carriage drive motor 214 has been provided in lieu of the low and high-speed motors previously described in connection with FIGURES 17 and 18. The circuit as shown in FIGURE 21 is interlocked to the main control circuit (FIGURE 16) in a similar manner as hereinbefore described, wherein electrical power is supplied to the carriage control panel through lines 42L1', 42L2' and 42L3'. In addition, a stepping control relay 6CR" is provided which is connected by junctions 6–3' and 6–2' to terminals 6–3 and 6–2, respectively, of the circuit of FIGURE 16, such that in response to the closing of contact CR2–2 (FIGURE 16), the control relay coil 6CR" is energized, closing its contact 6CR–1" and energizing solenoid SOL–1 as shown in FIGURE 21. The use of solenoid SOL–1, as illustrated diagrammatically in FIGURE 19, is for the purpose of engaging a lug 216 on the stepping drum 150, effecting a movement thereof from the home position to the first step. Similar check limit switches are provided as hereinbefore described which, in combination with the master cycle timer, prevent the carriage from initiating its next cycle until the remaining carriages have completed their cycle and the maximum cycle timer has timed out.

In the exemplary embodiment as shown in FIGURES 19 and 21, a 21-step stepping drum is provided incorporating 5 rows of pegs or cams 152 which are operative to selectively actuate switches D1–D5 inclusive. For the purposes of facilitating an understanding of the operational sequence as provided by the diagram shown in FIGURE 21, and employing a 21-step drum of which the last step 21 is the home position and the remaining steps 1–20 are operating positions, the following sequence of operation of the switch contacts is provided: Contact D1 is closed in steps 1, 5, 6, 13, 14 and 16–20; switch contact D2 is closed in steps 3, 8 and 11; switch contact D3 is closed in steps 2, 4, 7, 9, 12 and 15; switch contact D4 is closed in steps 3, 5, 8, 11, 13 and 16; and switch contact D5 is closed in step 10. Electrical energy to the control circuit is supplied by control transformer 216 connected to lines 42L2' and 42L3'.

Upon an indexing of the stepping drum to position 1 and with the carriage 42 in the position as shown in FIGURE 7, contact D1 is closed while down limit switch contact DLS is closed as the result of the lift mechanism on carriage 42 being in the lowered position which effects an energization of the coil of control relay CR12 which closes its normally open contacts CR12–1, CR12–2 and CR12–4 and opens its normally closed contacts CR12–3. Accordingly, reverse motor contactor RMC is energized through contacts D1 and CR12–1 closing its reverse motors contacts RMC–1 effecting an energization of the carriage drive motor 214, and carriage 42 moves from the position as shown in solid lines toward the position as shown in phantom in FIGURE 7. On attaining the position above station S13 an actuator such as the actuator 192 in FIGURE 19 coacts with cog wheel 188 effecting an indexing of the drum to the second position or step thereby opening contact D1, de-energizing the coil RMC and opening its contacts RMC–1 de-energizing the drive motor. Switch contact D3 is closed in position two of the stepping drum whereby up-motor contactor coil UMC is energized through normally closed contact CR11–2, effecting a closing of its up contacts UMC–1 and energizing the lift motor 218 removing a work rack from station S13, as illustrated in FIGURE 7. As the lift mechanism commences its lifting movement, down position limit switch contact DLS is released and opens de-energizing CR12, and as the lift mechanism approaches the raised position, up-position limit switch contact ULS is actuated and closed energizing the coil of control relay CR11 which opens its normally closed contact CR11–2, de-energizing the coil of up-motor contactor UMC and de-energizing the lift motor. At the same time contact CR11–1 is closed energizing forward motor contactor FMC which closes its contacts FMC–1 causing the drive motor 214 to move in a forward direction advancing carriage 42 from a position as shown in phantom in FIGURE 7 to the position as shown in solid lines in FIGURE 8 above station S14.

On approaching station S14, the stepping drum is again indexed to position 3 with the result that contact D3 is opened, de-energizing the forward motor contactor and the drive motor while contact D4 is closed which energizes the down-motor contactor coil DMC through normally closed contact CR12–3, effecting an energization of the lift motor 218 which commences its descending movement. As the lift mechanism lowers, up-position limit switch contact ULS is opened de-energizing control coil CR11 and on attaining the lowered position, down-position limit switch contact DLS is closed energizing coil CR12 which opens its normally closed contacts CR12–3 de-energizing coil DMC and halting the lift motor 218. At the same time contact CR12–2 is energized which through contact D2 which is closed in position 3 of the stepping drum energizes coil FMC whereupon the drive motor is again energized in a forward direction effecting movement of the carriage from the position shown in FIGURE 8 to the position as shown in FIGURE 9 above station S15. On attaining that position the stepping drum is again indexed to position 4 opening contact D2 and de-energizing the drive motor while closing contact D3 and through normally closed contact CR11–2 energizes the up-motor contactor coil UMC whereupon the work rack at station S15 is moved to the raised position.

The sequence thereafter proceeds in a manner as previously described until the carriage attains the position as shown in phantom in FIGURE 11, wherein a dip operation is performed at station S17. This dip operation corresponds to position 10 on the stepping drum, in which case contact D5 is closed and which through closed timer contact TM10–1 and CR12–3 effects energization of coil DMC, whereupon the lift mechanism motor 218 is energized to lower the work rack. When the lift mechanism attains the lowered position, down-position limit switch contact DLS is closed, energizing coil CR12 which opens its normally closed contact CR12–3, de-energizing the coil DMC and the lift motor 218 and at the same time contact CR12–4 is closed energizing a clutch TMC–10 of a delay timer which through closed timer contact TM10–3 effects energization of the timer motor TM10. The timer motor commences to time a preset down-dwell period, at the expiration of which contacts TM10–1 through TM10–4 are moved to the opposite positions from that shown in FIGURE 21. The timer clutch TMC–10 remains energized through closed contact TM10–4, preventing a resetting of the delay timer while the closing of contact TM10–2 effects an energization of coil UMC, whereupon the lift motor 218 is again energized extracting the rack from station S17 as shown in FIGURE 11. When the lift mechanism attains the fully raised position, up-limit switch contact ULS is closed effecting an energization of coil CR11 which opens its normally closed contact CR11–2, dropping out the coil UMC and de-energizing the lift motor. At the same time, forward motor contactor coil FMC is energized through closed contacts D5, TM10–2 and CR11–1, whereupon the carriage moves in a forward direction from the position as shown in phantom in FIGURE 11 to the position as shown in solid lines in FIGURE 12. On attaining the position above station S18, the stepping drum is indexed to the next position 11, whereby contact D5 opens, de-energizing the timer clutch TMC–10 resulting in a resetting of the timer and a movement of its contacts to the position as shown in FIGURE 21.

Carriage 42 continues through the balance of the operating cycle as illustrated in FIGURES 12 through 14 until it again attains the position above station S14, as shown in solid lines in FIGURE 7, and in which position the stepping drum is in the home position 21. No further movement of the carriage 42 occurs until the coil of solenoid SOL–1 is again energized through the interlocking circuitry of the master control panel in a manner as previously described.

It will be apparent from the description as provided in connection with FIGURE 21, and the mechanical advancing mechanism illustrated in FIGURE 19 that the use of left and right slowdown and stop limit switches is obviated by virtue of the mechanical stepping of the stepping drum such that it is only necessary to provide a check cam 136, as shown in FIGURE 5, and a check limit switch such as limit switch TLS–2 on the machine frame to interlock the movements of the individual carriages, avoiding thereby any conflict along the overlapping sections of their travel. It is also contemplated, in order to assure a more positive alignment between the lift mechanisms on the carriages and the work rack supports at the stations upon a de-energization of the drive motor in accordance with the arrangement illustrated in FIGURES 19 and 21, that a suitable solenoid-actuated pawl can be included on the carriage which, in response to an actuation and mechanical stepping of the drum, is effective to engage suitable coacting means disposed adjacent to the supporting rail for stopping and retaining the carriage in the appropriate aligned position, avoiding thereby any override of the carriage as may be occasioned as a result of the inertia thereof. Ordinarily, however, such coacting means for positioning the carriage are not necessary, particularly when a carriage drive motor incorporating a brake mechanism therein is employed assuring positive stoppage of the carriage upon a stepping of the drum.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a conveying machine including a carriage movably and guidably mounted on a frame extending along a series of treating stations, the carriage including reversible drive means for independently moving the carriage along at least a portion of the stations and lift means including power means for independently raising and lowering the lift means for removing and depositing workpieces at the stations, the improvement comprising control means for providing automatic coordinated operation of the drive means and power means on the carriage in a preselected sequence, said control means including programming means on the carriage provided with a programmed operating cycle for the drive means and power means on the carriage, indexing means for advancing said programming means through successive steps, first sensing means and second sensing means on the carriage operable when actuated to energize said indexing means for indexing said programming means to the next operating step and to de-energize said drive means, a series of alternately disposed first and second actuating means disposed at spaced intervals along said frame for alternately actuating said first and said second sensing means in response to travel of said carriage, third sensing means on the carriage for sensing the raised and lowered position of the lift means thereon, means operable in response to actuation of said first, second and third sensing means for energizing said indexing means and indexing said programming means to the next operating step, said programming means selectively operable to render said first and said second sensing means inoperative to de-energize said drive means when actuated.

2. In a conveying machine including a carriage movably and guidably mounted on a frame extending along a series of treating stations, the carriage including reversible drive means for independently moving the carriage along at least a portion of the stations and lift means including power means for independently raising and lowering the lift means for removing and depositing workpieces at the stations, the improvement comprising control means for providing automatic coordinated operation of the drive means and power means on the carriage in a preselected sequence, said control means including programming means on the carriage provided with a programmed operating cycle for the drive means and power means on the carriage, indexing means for advancing said programming means through successive steps, first sensing means on the carriage operable to de-energize said drive means and energize said indexing means when actuated, cooperating means disposed at spaced intervals along the frame for sensing by said sensing means in response to the longitudinal travel of said carriage, second sensing means on the carriage for sensing the raised and lowered position of the lift means thereon, means operable in response to actuation of said first and said second sensing means for energizing said indexing means and indexing said programming means to the next operating step, said programming means selectively operable to render said first sensing means inoperative to de-energize said drive means when actuated.

3. In a conveying machine including a carriage movably and guidably mounted on a frame extending along a series of treating stations, the carriage including reversible drive means for independently moving the carriage along at least a portion of the stations and lift means including power means for independently raising and lowering the lift means for removing and depositing workpieces at the stations, the improvement comprising control means for providing automatic coordinated operation of the drive means and power means on the carriage in a preselected sequence, said control means including programming means on the carriage provided with a programmed operating cycle for the drive means and power means on the carriage, indexing means for advancing said programming means through successive steps, first sensing means on the carriage operable to de-energize said drive means and energize said indexing means when actuated, cooperating means disposed at spaced intervals along the frame for sensing by said sensing means in response to the longitudinal travel of said carriage, second sensing means on the carriage for sensing the raised and lowered position of the lift means thereon, means operable in response to actuation of said first and said second sensing means for energizing said indexing means and indexing said programming means to the next operating step, said programming means selectively operable to render said first sensing means inoperative to de-energize said drive means when actuated, and timing means for rendering said indexing means inoperative after the completion of a cycle of said programming means until a preselected time interval has expired.

4. In a conveying machine including a carriage movably and guidably mounted on a frame extending along a series of treating stations, the carriage including two-speed reversible drive means for independently moving the carriage along at least a portion of the stations and lift means including power means for independently raising and lowering the lift means for removing and depositing workpieces at the stations, the improvement comprising control means for providing automatic coordinated operation of the drive means and power means on the carriage in a preselected sequence, said control means including programming means on the carriage provided with a programmed operating cycle for the drive means and power means on the carriage, indexing means for advancing said programming means through successive steps, first sensing means on the carriage operable when actuated to effect a slowdown of said drive means, second sensing means on the carriage operable when actuated to energize said indexing means for indexing said programming means to the next operating step and to de-energize said drive means, cooperating means disposed at spaced intervals along the frame for sensing by said first and second sensing means in response to the longitudinal travel of the carriage, third sensing means on the carriage for sensing the raised and lowered position of the lift means thereon, means operable in response to actuation of said second and said third sensing means for energizing said indexing means and indexing said programming means to the next operating step, said programming means selectively operable to render said first and said second sensing means inoperative for effecting a slowdown and a de-energization, respectively, of said drive means when actuated.

5. In a conveying machine including a carriage movably and guidably mounted on a frame extending along a series of treating stations, the carriage including two-speed reversible drive means for independently moving the carriage along at least a portion of the stations and lift means including power means for independently raising and lowering the lift means for removing and depositing workpieces at the stations, the improvement comprising control means for providing automatic coordinated operation of the drive means and power means on the carriage in a preselected sequence, said control means including programming means on the carriage provided with a programmed operating cycle for the drive means and power means on the carriage, indexing means for advancing said programming means through successive steps, a first pair of sensing means and a second pair of sensing means on the carriage, one of each said pair of sening means operable when actuated to effect a slowdown of said drive means, the other of each of said pair of said sensing means operable when actuated to energize said indexing means for indexing said programming means to the next operating step and to de-energize said drive means, a series of alternately disposed first and second actuating means positioned at spaced intervals along said frame for alternatively actuating said first pair and said second pair of sensing means in response to the travel of said carriage, third sensing means on the carriage for sensing the raised and lowered position of the lift means thereon and for energizing said indexing means when actuated, said programming means selectively operable to render said one and said other of said first and said second pair of sensing means inoperative for effecting a slowdown and a de-energization of said drive means, respectively, when actuated.

6. In a conveying machine including a plurality of carriages movably and guidably mounted on a frame extending along a series of treating stations, each carriage including reversible drive means for independently moving the carriage along at least a portion of the stations and lift means including power means for independently raising and lowering the lift means for removing and depositing workpieces at the stations, the improvement comprising control means for providing automatic coordinated operation of each drive means and each power means of each carriage in a preselected sequence, said control means including individual programming means on each carriage provided with a programmed operating cycle for the drive means and the power means on that carriage, indexing means on each carriage for advancing said programming means through successive steps, first sensing means on each carriage operable to energize said indexing means and to de-energize said drive means when actuated, cooperating means disposed at spaced intervals along the frame for sensing by said sensing means in response to the longitudinal travel of said carriage, second sensing means on each carriage for sensing the raised and lowered position of the lift means thereon, means operable in response to actuation of said first and said second sensing means for energizing said indexing means and indexing said programming means to the next operating step, said programming means on each carriage selectively operable to render said first sensing means on each carriage inoperative to de-energize said drive means thereon when actuated.

7. In a conveying machine including a plurality of a carriages movably and guidably mounted on a frame extending along a series of treating stations, each carriage including reversible drive means for independently moving the carriage along at least a portion of the stations and lift means including power means for independently raising and lowering the lift means for removing and depositing workpieces at the stations, the improvement comprising control means for providing automatic coordinated operation of each drive means and each power means of each carriage in a preselected sequence, said control means including individual programming means on each carriage provided with a programmed operating cycle for the drive means and the power means on that carriage, indexing means on each carriage for advancing said programming means through successive steps, sensing means on each carriage, cooperating means disposed at spaced intervals along the frame for sensing by said sensing means in response to the longitudinal travel of said carriage, means on each carriage operable in response to actuation of said sensing means thereon for energizing said indexing means and indexing said programming means to the next operating step and for de-energizing said drive means, each said programming means selectively operable to render said sensing means on that carriage inoperative to de-energize said drive means when actuated, and timing means for rendering said indexing means on each carriage inoperative after the completion of a cycle of each said programming means until a preselected time interval has expired.

8. In a conveying machine including a plurality of carriages movably and guidably mounted on a frame extending along a series of treating stations, each carriage including reversible drive means for independently moving the carriage along at least a portion of the stations and lift means including power means for independently raising and lowering the lift means for removing and depositing workpieces at the stations, the improvement comprising control means for providing automatic coordinated operation of each drive means and each power means of each carriage in a preselected sequence, said control means including individual programming means on each carriage provided with a programmed operating cycle for the drive means and the power means on that carriage, indexing means on each carriage for advancing said programming means through successive steps, first sensing means on each carriage operable to energize said indexing means and to de-energize said drive means when actuated, cooperating means disposed at spaced intervals along the frame for sensing by said sensing means in response to the longitudinal travel of said carriage, second sensing means on each carriage for sensing the raised and lowered position of the lift means thereon, means operable in response to acutation of said first and said second sensing means for energizing said indexing means and indexing said programming means to the next operating step, said programming means on each carriage selectively operable to render said first sensing means on each carriage inoperative to de-energize said drive means thereon when actuated, and timing means for rendering said indexing means on each carriage inoperative after the completion of a cycle of each said programming means until a preselected time interval has expired.

9. In a conveying machine including a plurality of carriages movably and guidably mounted on a frame extending along a series of treating stations, each carriage including reversible drive means for independently moving the carriage along at least a portion of the stations and lift means including power means for independently raising and lowering the lift means for removing and depositing workpieces at the stations, the improvement comprising control means for providing automatic coordinated operation of each drive means and each power means of each carriage in a preselected sequence, said control means including individual programming means on each carriage provided with a programmed operating cycle for the drive means and the power means on that carriage, indexing means on each carriage for advancing said programming means through successive steps, sensing means on each carriage, cooperating means disposed at spaced intervals along the frame for sensing by said sensing means in response to the longitudinal travel of said carriage, means on each carriage operable in response to actuation of said sensing means thereon for energizing said indexing means and indexing said programming means to the next operating step and for de-energizing said drive means, each said programming means selectively operable to render said sensing means on that carriage inoperative to de-energize said drive means when actuated, coacting sensing means and actuating means on each said carriage and at selected positions on said frame for sensing the respective position of each said carriage, and means interlocked with said coacting sensing means and actuating means operable to render said indexing means on each carriage inoperative until each of said coacting sensing means has been actuated by each respective carriage.

10. In a conveying machine including a plurality of carriages movably and guidably mounted on a frame extending along a series of treating stations, each carriage including two-speed reversible drive means for independently moving the carriage along at least a portion of the stations and lift means including power means for independently raising and lowering the lift means for removing and depositing workpieces at the stations, the improvement comprising control means for providing automatic coordinated operation of each drive means and each power means of each carriage in a preselected sequence, said control means including individual programming means on each carriage provided with a programmed operating cycle for the drive means and the power means on that carriage, indexing means on each carriage for advancing said programming means through successive steps, first sensing means on each carriage operable when actuated to effect a slowdown of said drive means, second sensing means on each carriage operable when actuated to energize said indexing means for indexing said programming means to the next operating step and to de-energize said drive means on that carriage, cooperating means disposed at spaced intervals along the frame for sensing by said first and said second sensing means on each carriage in response to the longitudinal travel of each carriage, third sensing means on each carriage for sensing the raised and lowered position of the lift means thereon, means operable in response to actuation of said second and third sensing means for energizing said indexing means on each carriage and indexing said programming means thereon to the next operating step, said programming means on each carriage selectively operable to render said first and said second sensing means inoperative for effecting a slowdown and a de-energization, respectively, of said drive means on that carriage when actuated.

11. In a conveying machine including a plurality of carriages movably and guidably mounted on a frame extending along a series of treating stations, each carriage including two-speed reversible drive means for independently moving the carriage along at least a portion of the stations and lift means including power means for independently raising and lowering the lift means for removing and depositing workpieces at the stations, the improvement comprising control means for providing automatic coordinated operation of each drive means and each power means of each carriage in a preselected sequence, said control means including individual programming means on each carriage provided with a programmed operating cycle for the drive means and the power means on that carriage, indexing means on each carriage for advancing said programming means through successive steps, a first pair of sensing means and a second pair of sensing means on each carriage, one of each pair of sensing means operable when actuated to effect a slowdown of said drive means on that carriage, the other of each of said pair of sensing means operable when actuated to energize said indexing means for indexing said programming means to the next operating step and to de-energize said drive means on that carriage, a series of alternately disposed first and second actuating means positioned at spaced intervals along said frame for alternately actuating said first pair and said second pair of sensing means on each carriage in response to the travel of each carriage, third sensing means on each carriage for sensing the raised and lowered position of said lift means thereon and for energizing said indexing means when actuated, said programming means on each carriage operable to render said one and said other of said first and said second pair of sensing means on that carriage inoperative for effecting a slowdown and a de-energization of said drive means, respectively, thereon when actuated.

12. In a conveying machine including a plurality of carriages movably and guidably mounted on a frame extending along a series of treating stations, each carriage including two-speed reversible drive means for independently moving the carriage along at least a portion of the stations and lift means including power means for independently raising and lowering the lift means for removing and depositing workpieces at the stations, the improvement comprising control means for providing automatic coordinated operation of each drive means and each power means of each carriage in a preselected sequence, said control means including individual programming means on each carriage provided with a programmed operating cycle for the drive means and the power means on that carriage, indexing means on each carriage for advancing said programming means through successive steps, first sensing means on each carriage operable when actuated to effect a slowdown of said drive means on that carriage, second sensing means on each carriage operable when actuated to energize said indexing means on that carriage for indexing said programming means to the next operating step and to de-energize said drive means, cooperating means disposed at spaced intervals along the frame for sensing by said first and said second sensing means on each carriage in response to the longitudinal travel of each carriage, said programming means on each carriage selectively operable to render said first and said second sensing means on that carriage inoperative for effecting a slowdown and a de-energization, respectively, of said drive means when actuated, and timing means for rendering said indexing means on each carriage inoperative after the completion of a cycle of said programming means on each carriage until a preselected time interval has expired.

13. In a conveying machine including a plurality of carriages movably and guidably mounted on a frame extending along a series of treating stations, each carriage including two-speed reversible drive means for independently moving the carriage along at least a portion of the stations and lift means including power means for independently raising and lowering the lift means for removing and depositing workpieces at the stations, the improvement comprising control means for providing automatic coordinated operation of each drive means and each power means of each carriage in a preselected sequence, said control means including individual programming means on each carriage provided with a programmed operating cycle for the drive means and the power means on that carriage, indexing means on each carriage for advancing said programming means through successive steps, coacting sensing means and actuating means on each said carriage and at selected positions on said frame for sensing the respective position of each said carriage, and means interlocked with said coacting sensing means and actuating means operable to render said indexing means on each carriage inoperative until each of said coacting sensing means has been actuated by each respective carriage.

14. In a conveying machine including a plurality of carriages movably and guidably mounted on a frame extending along a series of treating stations, each carriage including two-speed reversible drive means for independently moving the carriage along at least a portion of the stations and lift means including power means for independently raising and lowering the lift means for removing and depositing workpieces at the stations, the improvement comprising control means for providing automatic coordinated operation of each drive means and each power means of each carriage in a preselected sequence, said control means including individual programming means on each carriage provided with a programmed operating cycle for the drive means and the power means on that carriage, indexing means on each carriage for advancing said programming means through successive steps, first sensing means on each carriage operable when actuated to effect a slowdown of said drive means on that carriage, second sensing means on each carriage operable when actuated to energize said indexing means for indexing said programming means on the carriage to the next operating step and to de-energize said drive means thereon, cooperating means disposed at spaced intervals along the frame for sensing by said first and said second sensing means in response to the longitudinal travel of each carriage, said programming means selectively operable to render said first and said second sensing means inoperative for effecting a slowdown and a de-energization, respectively, of said drive means on that carriage when actuated, timing means for rendering said indexing means on each carriage inoperative after the completion of a cycle of each said programming means until a preselected time interval has expired, and coacting sensing means and actuating means on each said carriage and at select positions on said frame for sensing the respective position of each said carriage, and means interlocked with said coacting sensing means and actuating means operable to render said indexing means on each carriage inoperative until each of said coacting sensing means has been actuated by each respective carriage.

15. In a conveying machine including a carriage movably and guidably mounted on a frame extending along a series of treating stations, the carriage including reversible drive means for independently moving the carriage along at least a portion of the stations and lift means including power means for independently raising and lowering the lift means for removing and depositing workpieces at the stations, the improvement comprising control means for providing automatic coordinated operation of the drive means and power means on the carriage in a preselected sequence, said control means including programming means on the carriage provided with a programmed operating cycle for the drive means and power means on the carriage, indexing means on the carriage drivingly coupled to said programming means, coacting means disposed along the path of travel of the carriage and engageable with said indexing means for advancing said programming means through successive steps in response to the movement of the carriage, sensing means on the carriage for sensing the raised and lowered position of the lift means thereon, and means operable in response to actuation of said sensing means and said programming means for selectively energizing and de-energizing said drive means and power means on the carriage.

16. In a conveying machine including a carriage movably and guidably mounted on a frame extending along a series of treating stations, the carriage including reversible drive means for independently moving the carriage along at least a portion of the stations and lift means including power means for independently raising and lowering the lift means for removing and depositing workpieces at the stations, the improvement comprising control means for providing automatic coordinated operation of the drive means and power means on the carriage in a preselected sequence, said control means including programming means on the carriage provided with a programmed operating cycle for the drive means and power means on the carriage, indexing means on the carriage drivingly coupled to said programming means, coacting means disposed along the path of travel of the carriage and engageable with said indexing means for advancing said programming means through successive steps in response to the movement of the carriage, sensing means on the carriage for sensing the raised and lowered position of the lift means thereon, means operable in response to actuation of said sensing means and said programming means for selectively energizing and de-energizing said drive means and power means on the carriage, and timing means for preventing energization of said drive means and said power means after the completion of a cycle of said programming means until a preselected time interval has expired.

17. In a conveying machine including a plurality of carriages movably and guidably mounted on a frame extending along a series of treating stations, each carriage including reversible drive means for independently moving the carriage along at least a portion of the stations and lift means including power means for independently raising and lowering the lift means for removing and depositing workpieces at the stations, the improvement comprising control means for providing automatic coordinated operation of each drive means and each power means of each carriage in a preselected sequence, said control means including individual programming means on each carriage provided with a programmed operating cycle for the drive means and the power means on that carriage, indexing means on each carriage drivingly coupled to said programming means thereon, and coacting means disposed along the path of travel of each carriage and engageable with said indexing means thereon for advancing said programming means through successive steps in response to the movement of that carriage, sensing means on each carriage for sensing the raised and lowered position of the lift means thereon, and means operable in response to the actuation of said sensing means and said programming means on each carriage for selectively energizing and de-energizing said drive means and power means thereon.

18. In a conveying machine including a plurality of carriages movably and guidably mounted on a frame extending along a series of treating stations, each carriage including reversible drive means for independently moving the carriage along at least a portion of the stations and lift means including power means for independently raising and lowering the lift means for removing and depositing workpieces at the stations, the improvement comprising control means for providing automatc co-ordinated operation of each drive means and each power means of each carriage in a preselected sequence, said control means including individual programming means on each carriage provided with a programmed operating cycle for the drive means and the power means on that carriage, indexing means on each carriage drivingly coupled to said programming means thereon, and coacting means disposed along the path of travel of each carriage and engageable with said indexing means thereon for advancing said programming means through successive steps in response to the movement of that carriage, sensing means on each carriage for sensing the raised and lowered position of the lift means thereon, means operable in response to the actuation of said sensing means and said programming means on each carriage for selectively energizing and de-energizing said drive means and power means thereon, and timing means for preventing energization of said drive means and said power means on each carriage after the completion of a cycle of each of said programming means until a preselected time interval has expired.

19. In a conveying machine including a plurality of carriages movably and guidably mounted on a frame extending along a series of treating stations, each carriage including reversible drive means for independently moving the carriage along at least a portion of the stations and lift means including power means for independently raising and lowering the lift means for removing and depositing workpieces at the stations, the improvement comprising control means for providing automatic co-ordinated operation of each drive means and each power means of each carriage in a preselected sequence, said control means including individual programming means on each carriage provided with a programmed operating cycle for the drive means and the power means on that carriage, indexing means on each carriage drivingly coupled to said programming means thereon, and coacting means disposed along the path of travel of each carriage and engageable with said indexing means thereon for advancing said programming means through successive steps in response to the movement of that carriage, sensing means on each carriage for sensing the raised and lowered position of the lift means thereon, means operable in response to the actuation of said sensing means and said programming means on each carriage for selectively energizing and de-energizing said drive means and power means thereon, coacting second sensing means and actuating means on each said carriage and at selected positions on said frame for sensing the respective position of each said carriage, and means interlocked with said second sensing means and actuating means operable to prevent energization of said drive means and said power means on each carriage until each of said second sensing means has been actuated by each respective carriage.

20. In a conveying machine including a plurality of carriages movably and guidably mounted on a frame extending along a series of treating stations, each carriage including reversible drive means for independently moving the carriage along at least a portion of the stations and lift means including power means for independently raising and lowering the lift means for removing and depositing workpieces at the stations, the improvement comprising control means for providing automatic coordinated operation of each drive means and each power means of each carriage in a preselected sequence, said control means including individual programming means on each carriage provided with a programmed operating cycle for the drive means and the power means on that carriage, indexing means on each carriage drivingly coupled to said programming means thereon, coacting means disposed along the path of travel of each carriage and engageable with said indexing means thereon for advancing said programming means through successive steps in response to the movement of that carriage, sensing means on each carriage for sensing the raised and lowered position of the lift means thereon, means operable in response to the actuation of said sensing means and said programming means on each carriage for selectively energizing and de-energizing said drive means and power means thereon, coacting second sensing means and actuating means on each said carriage and at selected positions on said frame for sensing the respective position of each said carriage, means interlocked with said second sensing means and actuating means operable to prevent energization of said drive means and said power means on each carriage until each of said second sensing means has been actuated by each respective carriage, and timing means for preventing energization of said drive means and said power means on each carriage after the completion of a cycle of each of said programming means until a preselected time interval has expired.

21. In a conveying machine including a plurality of carriages movably and guidably mounted on a frame extending along a series of treating stations, each carriage including reversible drive means for independently moving the carriage along at least a portion of the stations and lift means including power means for independently raising and lowering the lift means for removing and depositing workpieces at the stations, the improvement comprising control means for providing automatic coordinated operation of each drive means and each power means of each carriage in a preselected sequence, said control means including individual programming means on each carriage provided with a programmed operating cycle for the drive means and the power means on that carriage, indexing means on each carriage drivingly coupled to said programming means thereon, coacting means disposed along the path of travel of each carriage and engageable with said indexing means thereon for advancing said programming means through successive steps in response to the movement of that carriage, sensing means on each carriage for sensing the raised and lowered position of the lift means thereon, means operable in response to the actuation of said sensing means and said programming means on each carriage for selectively energizing and de-energizing said drive means and power means thereon, timing means for preventing energization of said drive means and said power means on each carriage after the completion of a cycle of each of said programming means until a preselected time interval has expired, and means operative in responsive to the timing out of said timing means for mechanically advancing each said individual programming means to the first step of the next operating cycle.

22. In a conveying machine including a plurality of carriages movably and guidably mounted on a frame extending along a series of treating stations, each carriage including reversible drive means for independently moving the carriage along at least a portion of the stations and lift means including power means for independently raising and lowering the lift means for removing and depositing workpieces at the stations, the improvement comprising control means for providing automatic coordinated operation of each drive means and each power means of each carriage in a preselected sequence, said control means including individual programming means on each carriage provided with a programmed operating cycle for the drive means and the power means on that carriage, indexing means on each carriage drivingly coupled to said programming means thereon, coacting means disposed along the path of travel of each carriage and engageable with said indexing means thereon for advancing said programming means through successive steps in response to the movement of that carriage, sensing means on each carriage for sensing the raised and lowered position of the lift means thereon, means operable in response to the actuation of said sensing means and said programming means on each carriage for selectively energizing and de-energizing said drive means and power means thereon, coacting second sensing means and actuating means on each said carriage and at selected positions on said frame for sensing the respective position of each said carriage, means interlocked with said second sensing means and actuating means operable to prevent energization of said drive means and said power means on each carriage until each of said second sensing means has been actuated by each respective carriage, each said programming means having a home position disposed sequentially before the program operating cycle, and means operatively connected to each said programming means for advancing said programming means from said home position to the first operating position of the cycle.

23. In a conveying machine including a plurality of carriages movably and guidably mounted on a frame extending along a series of treating stations, each carriage including reversible drive means for independently moving the carriage along at least a portion of the stations and lift means including power means for independently raising and lowering the lift means for removing and depositing workpieces at the stations, the improvement comprising control means for providing automatic coordinated operation of each drive means and each power means of each carriage in a preselected sequence, said control means including individual programming means on each carriage provided with a programmed operating cycle for the drive means and the power means on that carriage, indexing means on each carriage drivingly coupled to said programming means thereon, said indexing means including a drive shaft, a drive wheel on said drive shaft, coacting means on said drive wheel, a series of actuating means disposed at spaced intervals along the frame for mechanical engagement with said coacting means on said drive wheel effecting intermittent rotation thereof in the same direction in response to movement of said carriage relative to said actuating means effecting thereby an advancement of said programming means through successive steps, sensing means on each carriage for sensing the raised and lowered position of the lift means thereon, and means operable in response to the actuation of said sensing means and said programming means on each carriage for selectively energizing and de-energizing said drive means and said power means thereon.

References Cited
UNITED STATES PATENTS

| | | | |
|---|---|---|---|
| 2,925,000 | 2/1960 | Diener | 77—4 |
| 2,947,203 | 8/1960 | Ausenda et al. | 77—5 |
| 3,049,247 | 8/1962 | Lemelson | 214—16.4 |
| 3,088,610 | 5/1963 | Pianowski | 214—89 |

GERALD M. FORLENZA, *Primary Examiner.*